Nov. 19, 1963     L. D. HARMON     3,111,646
METHOD AND APPARATUS FOR READING CURSIVE SCRIPT
Filed May 31, 1960     17 Sheets-Sheet 1

INVENTOR
L. D. HARMON
BY
*A. E. Hirsch Jr.*
ATTORNEY

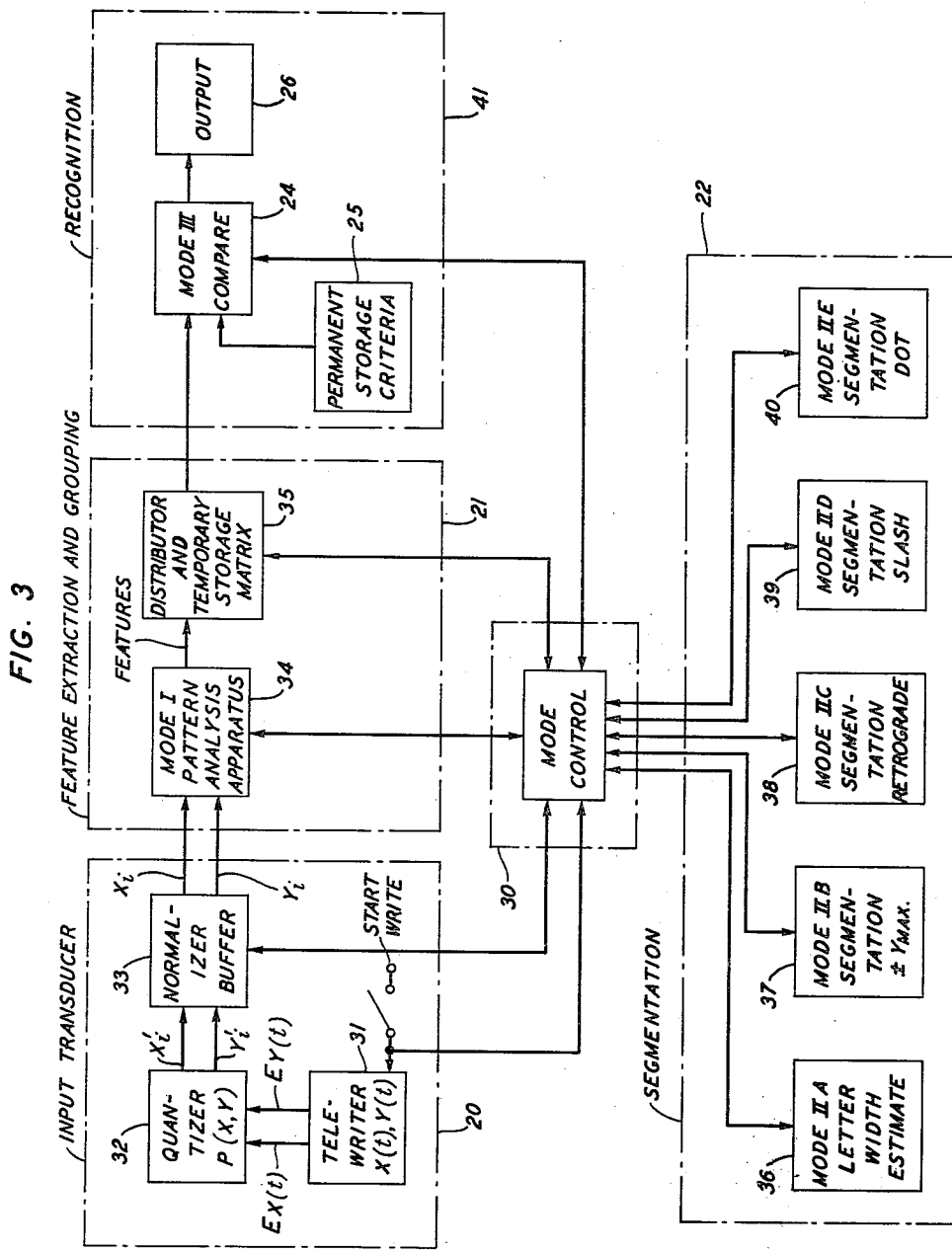

Nov. 19, 1963    L. D. HARMON    3,111,646
METHOD AND APPARATUS FOR READING CURSIVE SCRIPT
Filed May 31, 1960    17 Sheets-Sheet 3

ROW 4     +Y$_{MAX.}$ (ADJ.)
ROW 27    SEGMENTATION
ROW 24    SEGMENTATION INH. I

INVENTOR
L. D. HARMON
BY
*A. E. Hirsch Jr.*
ATTORNEY

Nov. 19, 1963   L. D. HARMON   3,111,646
METHOD AND APPARATUS FOR READING CURSIVE SCRIPT
Filed May 31, 1960   17 Sheets-Sheet 4

FIG. 6

INVENTOR
L. D. HARMON
BY
A. E. Hirsch Jr.
ATTORNEY

Nov. 19, 1963  L. D. HARMON  3,111,646
METHOD AND APPARATUS FOR READING CURSIVE SCRIPT
Filed May 31, 1960  17 Sheets-Sheet 5

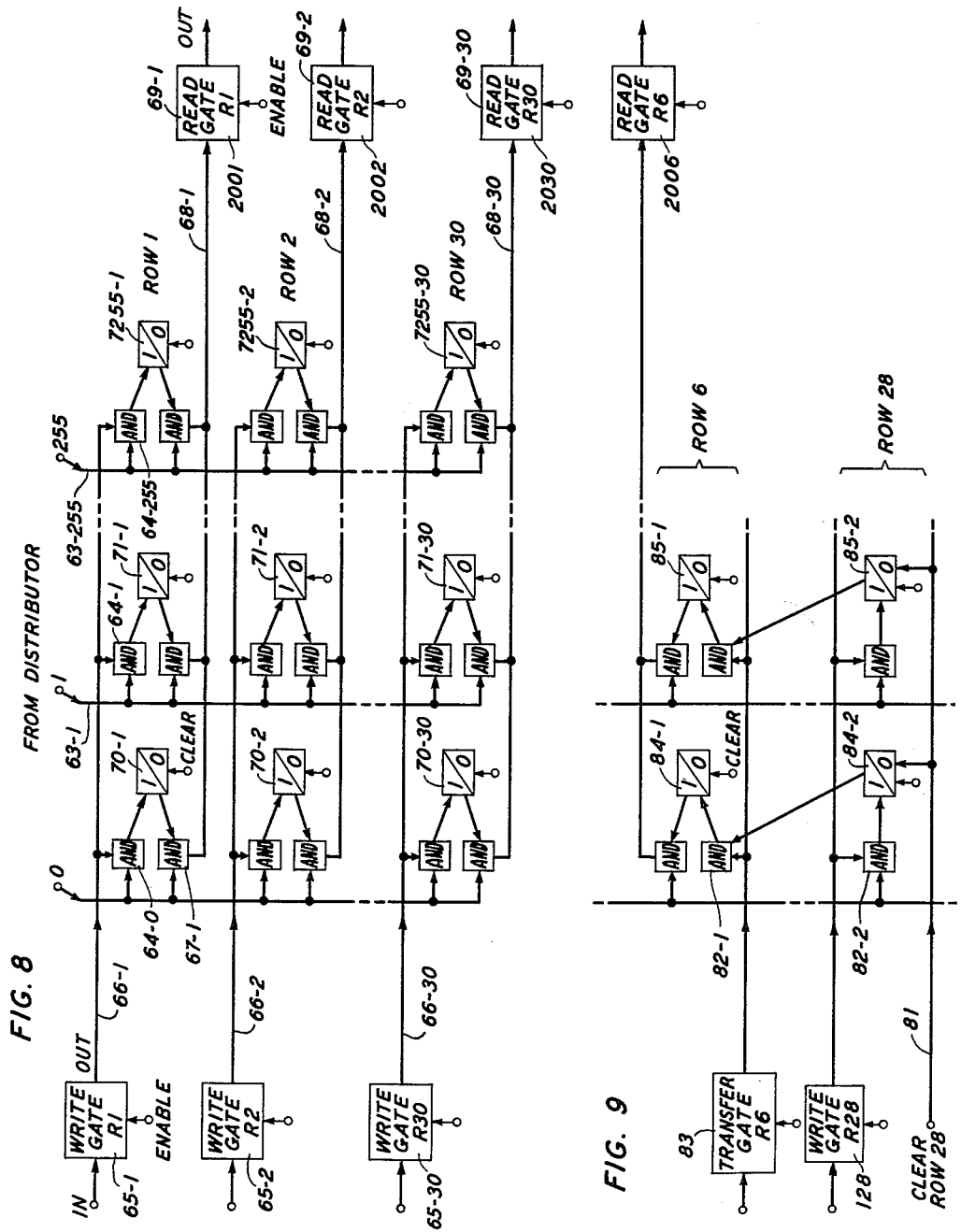

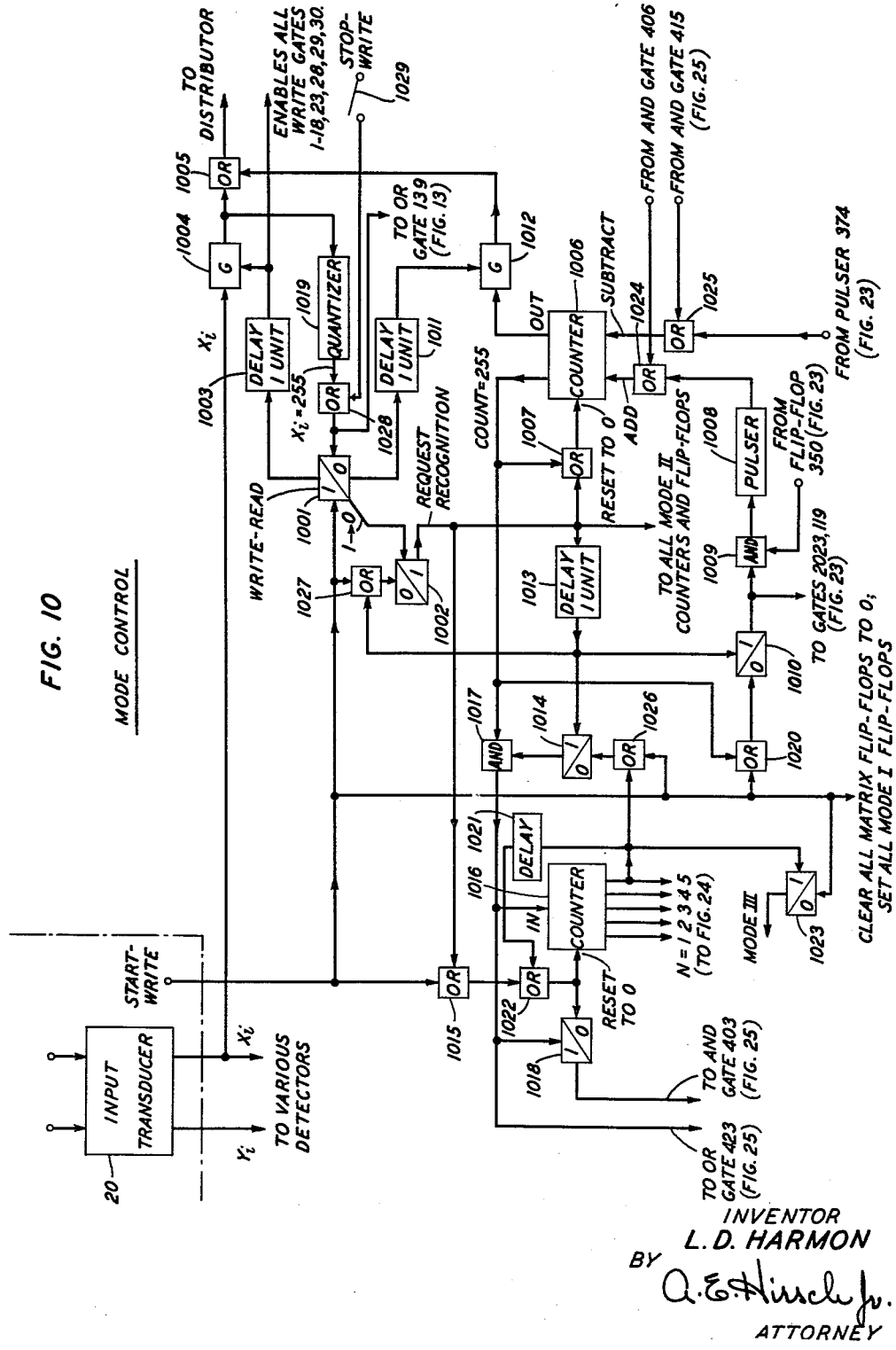

Nov. 19, 1963  L. D. HARMON  3,111,646
METHOD AND APPARATUS FOR READING CURSIVE SCRIPT
Filed May 31, 1960  17 Sheets-Sheet 9

INVENTOR
L. D. HARMON
BY
ATTORNEY

Nov. 19, 1963  L. D. HARMON  3,111,646
METHOD AND APPARATUS FOR READING CURSIVE SCRIPT
Filed May 31, 1960  17 Sheets-Sheet 11

INVENTOR
L. D. HARMON
BY
G. E. Hirsch Jr.
ATTORNEY

Nov. 19, 1963  L. D. HARMON  3,111,646
METHOD AND APPARATUS FOR READING CURSIVE SCRIPT
Filed May 31, 1960  17 Sheets-Sheet 12

INVENTOR
L. D. HARMON
BY
A. E. Hirsch
ATTORNEY

Nov. 19, 1963 L. D. HARMON 3,111,646
METHOD AND APPARATUS FOR READING CURSIVE SCRIPT
Filed May 31, 1960 17 Sheets-Sheet 13

INVENTOR
L. D. HARMON
BY
A. E. Hirsch Jr.
ATTORNEY

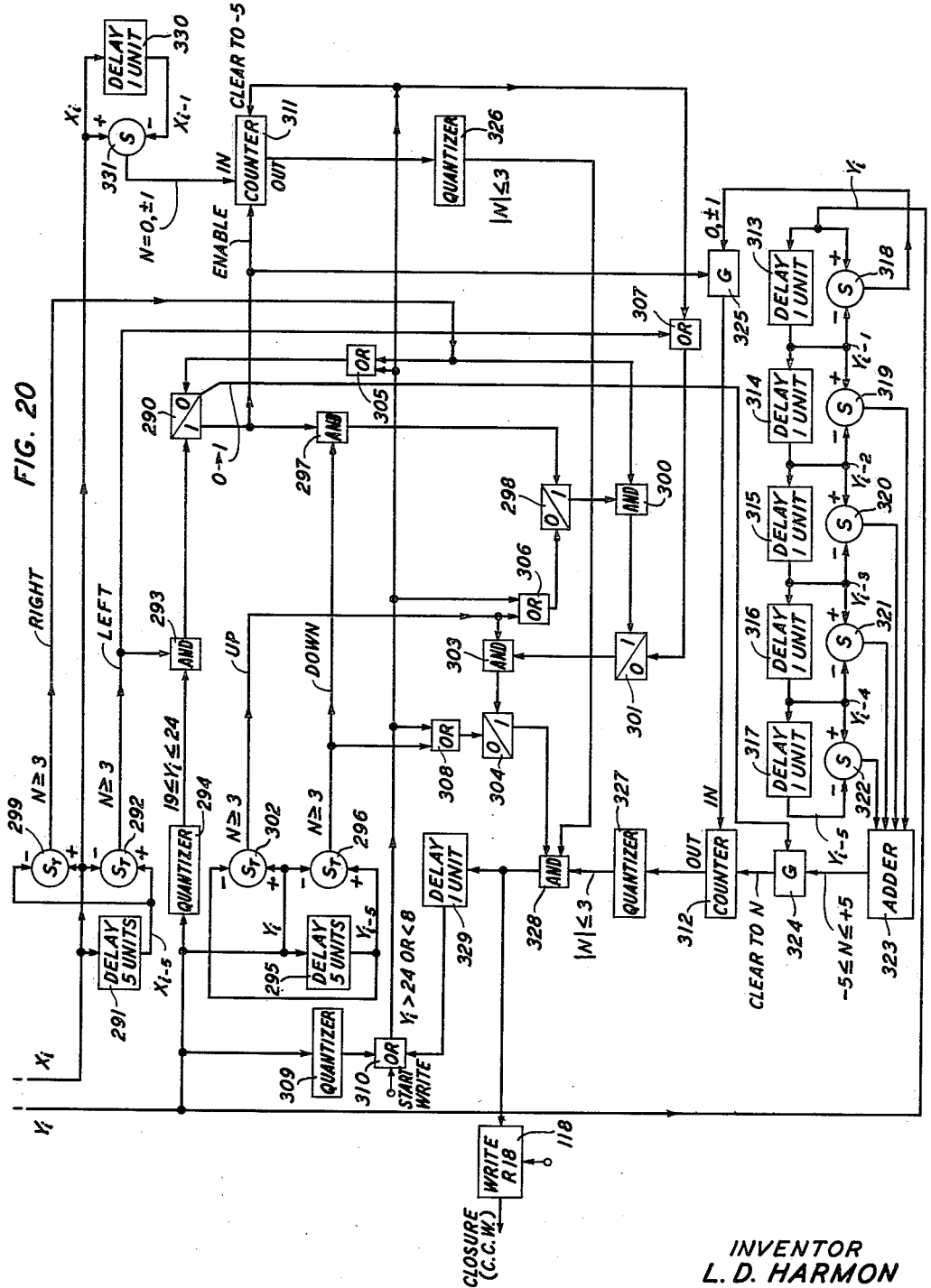

Nov. 19, 1963        L. D. HARMON        3,111,646
METHOD AND APPARATUS FOR READING CURSIVE SCRIPT
Filed May 31, 1960                    17 Sheets—Sheet 15

INVENTOR
L. D. HARMON
BY
G. E. Hirsch Jr.
ATTORNEY

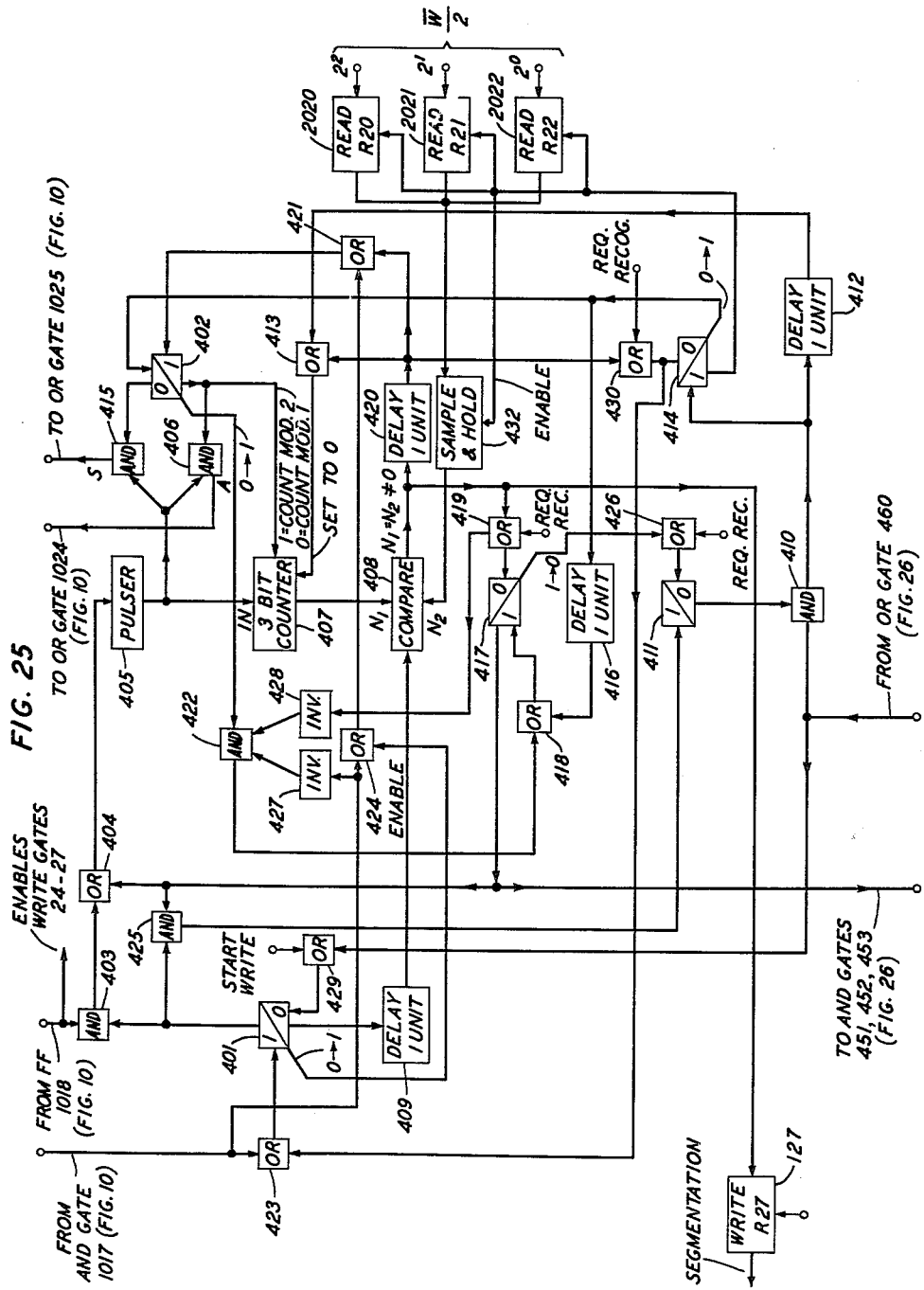

United States Patent Office 3,111,646
Patented Nov. 19, 1963

3,111,646
METHOD AND APPARATUS FOR READING
CURSIVE SCRIPT
Leon D. Harmon, Warren Township, Somerset County,
N.J., assignor to Bell Telephone Laboratories, Incorporated, New York, N.Y., a corporation of New York
Filed May 31, 1960, Ser. No. 33,015
16 Claims. (Cl. 340—146.3)

This invention relates to the automatic recognition and identification of two-dimensional figures, and more particularly to a method and apparatus for automatically segmenting handwritten continuous cursive script representing, for example, words in the English language, into discrete script letters, and for automatically recognizing and classifying the discrete script letters.

A principal object of the invention is the automatic translation of connected cursive script depicting patterns such as words or the like into a form suitable for use in automatic printing equipment such as electrically operated typesetters and typewriters, or into a language capable of being utilized directly in the control of computer or data processing equipment. More specifically its object is to convert connected cursive handwriting into what may be termed "machine language," i.e., to transfer written intelligence to machines or to other human beings.

It is often required that continuous handwritten material, that is, cursive script such as a plurality of alphabetic letters written in connected fashion, as distinguished from hand printed or machine printed material, be automatically identified. Unfortunately, machine recognition devices ordinarily respond only to a very restricted format of characters discretely isolated one from another and not to script characters written without clear spacing between the individual symbols. Thus, automatic character or pattern recognition in the past has generally been restricted to the inspection of single, well separated, simple line drawings of the sort that are used in typed or carefully hand printed characters.

In order to achieve machine recognition of the connected characters which form cursive script words, it is necessary that the words be segmented into their individual letter components. The segmentation of individual letters in cursive script may be likened to the segmentation of a spoken word into its individual elements, called phonemes, before the spoken word can be automatically identified. Segmentation in itself is an extremely difficult problem in the case of connected written script, in view of the extraordinary number of variations that handwritten material may take. These are variations not only as produced by different writers, but also as produced at different times by the same writer.

The present invention takes as its starting point the view that instructions for machine operations or the like can often best be accumulated and transcribed for use if the intermediate processing between the human being originating the instructions and the ultimate recipient is made as fully automatic as possible. In particular, individual letters handwritten by an operator, for example, in the English language, should be automatically translated into the corresponding machine language equivalent in the shortest possible time and with the greatest accuracy. While it is true that a translation operation in real time is limited to speeds commensurate with the writing speed of the operator, the freedom from error afforded thereby is of substantial significance. This occurs primarily because handwriting is a more natural operation for many people than is writing by means of an intervening device such as a keyboard.

It is a particular object of the present invention to perform real time translations of handwritten connected cursive script to a form directly acceptable by a large class of machines.

It is another object of the invention to segment automatically a continuous line trace of written intelligence into discrete portions that may be recognized as individual letters by fully automatic means.

These objects are attained in the present invention by extracting from a connected cursive pattern, such as an ensemble of Roman letters written together to form a word, a group of characteristic features of the pattern. From an analysis of selected characteristics, the word is segmented into a sequence of individual alphabetic letters. The salient characteristics associated with each discrete letter are then compared to a stored dictionary of characteristic letter elements and a manifestation of letter identity is produced.

The invention in one of its principal forms is realized by generating real time signals proportional to the coordinates of position of a writing instrument as it is moved over the writing surface of a telewriter or the like to produce written intelligence. The continuous coordinate signal information from the telewriter is quantized, that is, it is restricted to discrete values selected in each of two coordinate directions, and selectively registered in a storage medium or the like in accordance with selected individual letter characteristics. Such characteristics as vertical extensions, dots, crosses, slashes, cusps, retrograde strokes, closures, and the like, have been found to be particularly useful as identifying marks. In addition, an estimate is made of the number of letters in the written word and of the average letter width. These estimates are employed, together with selected ones of the individual letter characteristics, in a separate system operation automatically to segment each word into discrete letters. The segmentation operation selects and marks in sequence the termination of one letter and the beginning of another. Both letter recognition and the subsequent output indication are made on a letter-by-letter basis. Adequate provision thus need be made only for the detection of features characteristic of each of the twenty-six characters of the alphabet.

Although in the preferred embodiment of the invention slight constraints are placed on the vertical limits of the writing excursions, these need not in principle exist since the basic concepts upon which the invention is based permits handwriting of any size to be accommodated. In practice, well known computer techniques are employed for automatically compensating for size and position variations in the written material.

The invention will be fully apprehended from the following detailed description of illustrative embodiments thereof taken in connection with the appended drawings, in which:

FIG. 3 is a block schematic diagram showing in somewhat more detail the elements of the apparatus illustrated in FIG. 2;

FIG. 6 is a truth table illustrating the manner by which individual alphabetic letters are identified;

FIG. 8 is a block schematic diagram of register apparatus connected in a fashion to implement the tabulations of FIG. 7;

FIG. 9 is a block schematic diagram of specialized register apparatus connected in a fashion to implement the tabulations of FIG. 7;

FIG. 10 is a block schematic diagram of apparatus suitable for controlling the mode of operation of the apparatus of FIG. 4;

FIG. 20 is a block schematic diagram of apparatus suitable for extracting counterclockwise closure information from written cursive script;

Figure 26:
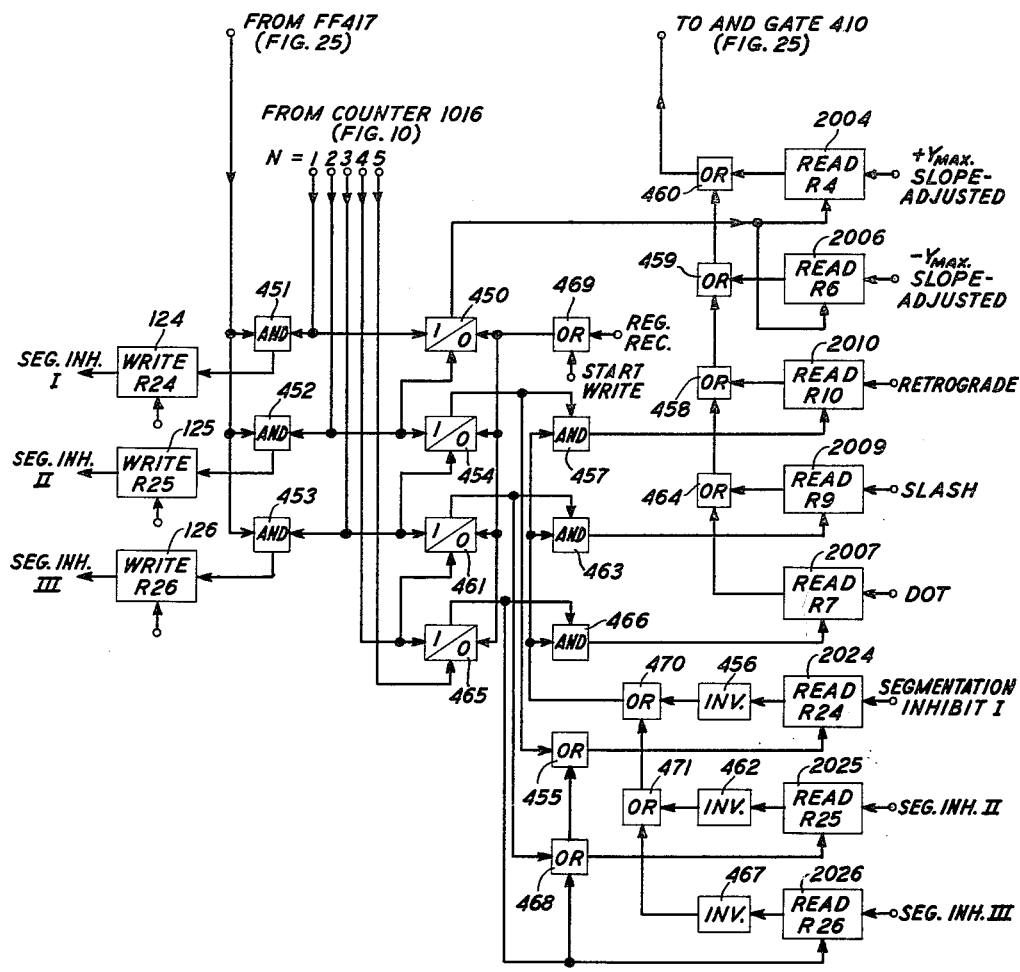

FIGS. 25 and 26 together form a block schematic diagram of apparatus suitable for segmenting sequences of connected cursive script into discrete alphabet letters.

In the interests of simplicity, the circuit diagrams to be discussed are presented, for the most part, in block schematic form, with single-line paths to direct the flow of information to the several apparatus components which process it. This rule is departed from in a few individual instances where the inclusion of electric input terminals and output terminals appears to add to the clarity of the exposition. It is to be understood that, in practice, each single-line information path will normally be realized with two electric conductors, one of which may in many cases be connected to ground. In addition, Start-Write, Write Gate enable, and Reset circuit interconnections for the most part, are not shown; these interconnections will be apparent to one skilled in the art.

Figure 1:
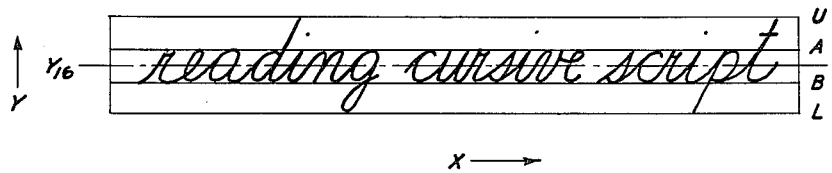
FIG. 1 is a pictorial representation of a typical sample of handwritten connected cursive script.

Referring now to the drawings, FIG. 1 shows a typical sample of handwritten connected cursive script. As an aid toward machine recognition, the script preferably is formed on a writing surface that has been divided normal to the direction of writing into three substantially equal areas, for example, by the two guide lines A and B shown in FIG. 1. The lower line B is regarded as a base line. The upper guide line A is used as a divider between small letters such as $a$, $e$, $m$, $u$, that are contained entirely between guide lines A and B, and vertically extended letters such as $b$, $l$, and $t$. Similarly, the base line B is used as a divider between small letters and downward extended letters such as $p$, $g$, and $q$ that extend considerably below the base line B. Two additional guide lines U and L may be prescribed if desired to limit upper extensions and lower extensions of letters, respectively, although this refinement is not necessary to a satisfactory operation of the apparatus of the invention.

GENERAL DESCRIPTION

Figure 2:
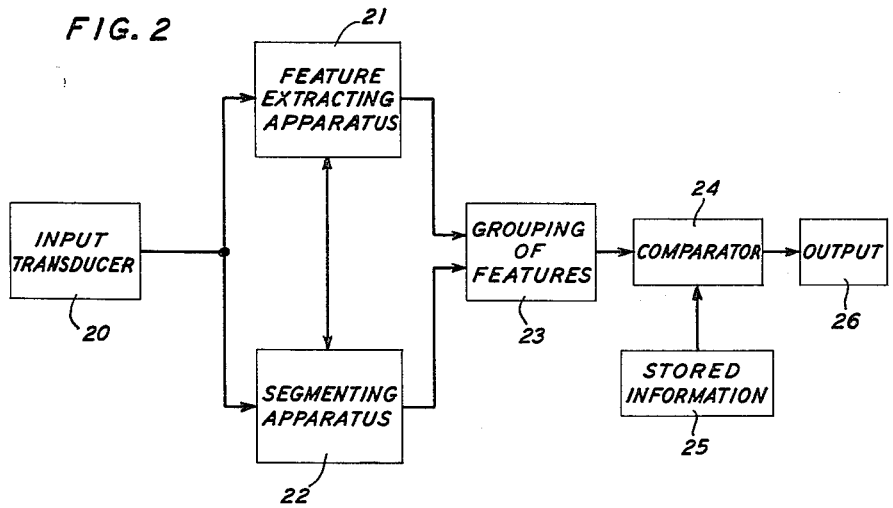
FIG. 2 is a functional block diagram illustrating the general organization and arrangement of the various elements of the invention.

FIG. 2 illustrates by way of introduction a functional block diagram of the general organization and arrangement of the various elements that together comprise the present invention.

Handwritten cursive script produced by a writer observing the rules outlined above is translated in input transducer 20 into a plurality of electrical signals. The electrical signals specify in real time the position of the writing instrument on the transducer writing surface as it progresses from left to right. The coordinate identifying signals from transducer 20 are supplied by parallel paths to two separate circuits for analysis.

Feature extracting apparatus 21 derives from the coordinate identifying signals distinctive features that together uniquely identify the letters of the English alphabet. These data are grouped according to the nature of the features in register apparatus 23 and are also supplied to segmenting apparatus 22.

Segmenting apparatus 22 operates both on the applied input signals and on selected ones of the identifying features supplied by apparatus 21 to supply to grouping apparatus 23, and to feature extracting apparatus 21, marks that identify the individual alphabetic letters in the continuous sequence of cursive traces being written at the input 20. Comparator 24 matches the grouped and segmented features of the input signal with information preregistered in storage information apparatus 25. The selected groups of features representing individual alphabetic letters are compared against the registered features representing, respectively, all of the letters of the stored alphabet. The highest correlation between the letter features supplied to comparator 24 with features stored in register 25 provides an output which may be utilized in any desired fashion, for example, in an output circuit 26.

A somewhat more detailed description of the various elements of the invention and of their modes of operation is given below.

*Input Apparatus*

Referring to FIG. 3, continuous coordinate line trace information $X(t)$ and $Y(t)$, where X and Y denote the coordinates of the writing surface of FIG. 1, is converted in input transducer 20 by means of a telewriter 31 or the like, under the control of a human operator into varying voltages $E_X(t)$ and $E_Y(t)$ that are proportional to the position of the telewriter stylus at every instant. Telewriter apparatus suitable for use in the invention is described in F. K. Becker Patent 2,925,467, granted February 16, 1960. Preparatory to entering a cursive script message on the telewriter surface, a Start-Write signal generated either by manual means, as by closing a switch in a battery circuit, or by automatic means employing, for example, a contact signal produced as the telewriter stylus engages the writing surface, is supplied to mode control apparatus 30.

Figure 4:
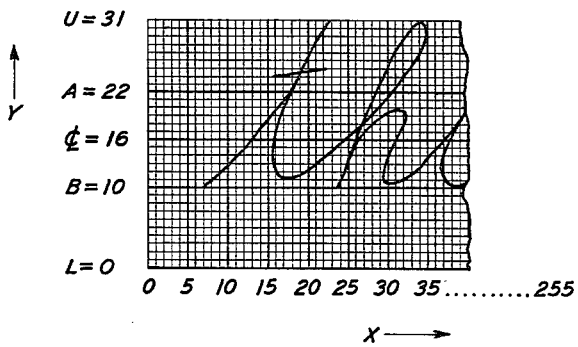
FIG. 4 is a drawing showing a representative sample of cursive script superimposed on a background subdivided in accordance with the quantization apparatus of FIG. 3.

The two voltages are restricted in quantizer 32 to one of a selected number of discrete levels in both the X and Y directions. For example, approximately two hundred fifty-six levels in the X direction and approximately thirty-two levels in the Y direction have been found to be satisfactory. Thus, at any epoch, a point $P(X_i, Y_i)$ in the quantized space denotes the exact stylus position. FIG. 4 shows by way of example a sample of cursive writing superimposed on a grid divided to show the manner by which discrete points of script are identified in terms of quantized coordinate locations on the writing area. Other quantization levels may, of course, be selected as optimum.

Output signals from quantizer 32 are preferably designated in binary form. That is, the amplitude level of each sample is specified by a binary number. For the quantizer values selected, an 8-bit code is sufficient to designate X signals and a 5-bit code is sufficient for Y signals. Alternatively, the quantizer output may comprise a pair of analog signals. In either case, the several apparatus elements used in implementing the invention are selected to process either digital or analog signals as required. Thus, if binary signals are employed, subtraction operations and the like are performed on a binary basis. Hence, the two X or two Y inputs to a subtractor are 8-bit binary numbers, and the output is an 8-bit binary representation of the arithmetical difference between the two inputs. If analog representation is employed, the subtractor circuit is supplied with two X or two Y signals whose amplitudes denote the respective values, and an output signal is developed in the subtractor whose amplitude is the arithmetic difference. All of the circuit elements employed in the apparatus to be described hereinafter, except as specifically noted, are well known in the art in both forms.

The two signals $X_i$ and $Y_i$ derived from the quantizer 32 may then in principle be supplied directly to feature extracting apparatus 21 and to segmentation apparatus 22 and, under the influence of mode control apparatus 30, be processed for ultimate recognition. It is preferable, however, to pass the signals through a normalizer-buffer 33. While the use of normalizer-buffer is not required, in principle, for satisfactory operation of the apparatus of the invention, it has nevertheless been found helpful since different writers dwell at portions of an alphabetic letter for different periods of time and hence with periodic sampling produce multiple, redundant signals.

Figure 5:
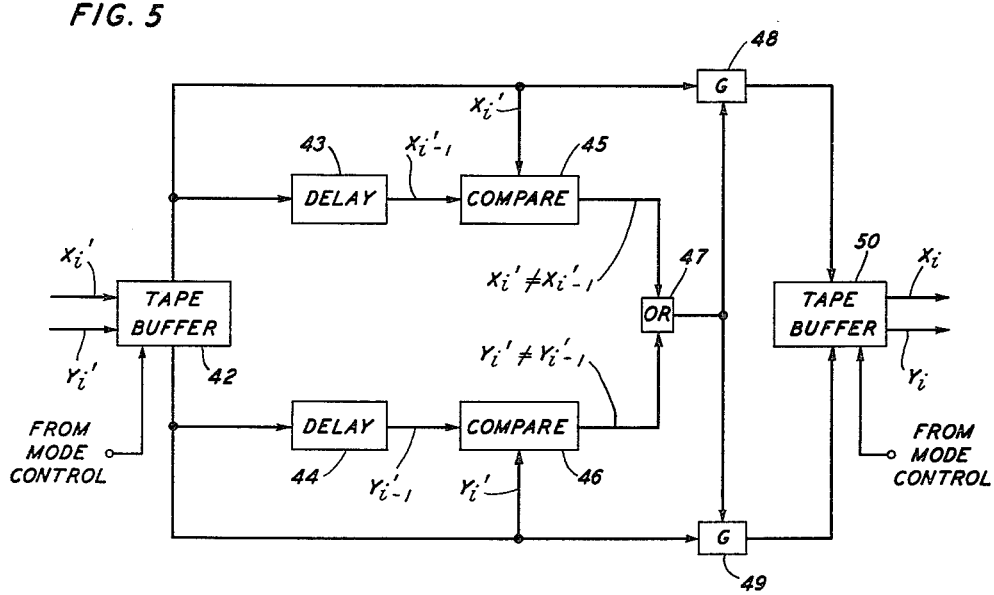
FIG. 5 is a block diagram illustrating the functional arrangement of normalizer-buffer apparatus suitable for use in the practice of the invention.

The normalizer-buffer apparatus accepts as an input a signal that varies in a random fashion on the time scale and transforms it into an output train of signals spaced at regular intervals on the time scale; that is, the apparatus transforms the X, Y input signals into a substantially regular sequence of signal pulses. The buffer apparatus may typically comprise a Start-Stop tape storage mechanism or electronic step-register apparatus. Suitable buffer apparatus is shown by way of example in FIG. 5. The quantized telewriter signals $X_i'$ and $Y_i'$ are written into tape buffer 42, which may take any form well known in the art, for the entire duration of the handwriting sample. Consequently, the signals are stored in real time on magnetic tape or the like. After all such signals have been stored, the mode control 30 initiates read out of tape buffer 42 so that redundant $X_i'$ and $Y_i'$ information may be removed. Such redundancies occur if the stylus dwells at one particular point as the script is being written, and the sampling process continues uniformly in time. There may thus be many adjacent $X_i'$ and $Y_i'$ signals which are unchanged in both X and Y. This, of course, is redundant information. To eliminate this useless information, the $X_i'$, $Y_i'$ signals read out of tape buffer 42 are each delayed in time by a prescribed short interval in delay lines 43 and 44, respectively, and $X_i'$ is compared with $X_{i-1}'$ and $Y_i'$ is compared with $Y_{i-1}'$ in comparators 45 and 46, respectively. If neither X nor Y has changed in this interval the OR gate 47 is not enabled. However, if either X or Y or both have changed in magnitude from one sample to the next, gate 47 is enabled. Consequently AND gates 48 and 49 are energized to pass, respectively, $X_i'$ and $Y_i'$ signals into tape buffer 50. Tape buffer 50 receives consecutive differing samples in X and Y, and records them in sequence as $X_i$ and $Y_i$. A continuous record of samples is thus recorded in the buffer in which only changes in the position of the original script trace are preserved. Redundant samples produced by dwells or the like are absent. After tape buffer 50 has registered all of the non-redundant samples from an entire message, the normalizing operation is complete. Control apparatus 30 permits the contents of buffer 50 to be read out continuously into the feature extraction, segmentation, and recognition elements, as required.

Mode Control Apparatus

All feature extraction, segmentation, and recognition operations are under the control of a central mode control circuit. In the block diagram of FIG. 3, interconnection between mode control apparatus 30 and each of the other circuits is shown by means of a single two-way line path. In the detailed description to follow it will be apparent however that the interconnections not only transfer information regarding mode of operation but also transfer input information from transducer 20 to the other circuits and provide means for exchanging processed information among the units.

A Start-Write signal supplied to the mode control apparatus initiates a sequence of operations. Initially feature extraction and grouping apparatus 21 is energized and segmentation apparatus 22 and recognition apparatus 31 are locked out. This condition of operation may be termed Mode I.

Mode I—Feature Extraction

The coordinate signals derived from input transducer 20 are supplied to pattern analysis apparatus 34. In Mode I operation, apparatus 34 examines the electrical representations of the cursive script being written to detect local features or characteristics that are used both to separate words into individual letters and to determine the identity of the letters. It has been found that each of the twenty-six letters of the alphabet can be uniquely identified by programming pattern analysis apparatus 34 to detect five major classes of cursive script features. They are:

(1) VERTICAL EXTENT

A useful division of the twenty-six alphabetic characters can be made by grouping letters according to mean vertical extension referred to the base line, i.e., to the extent in the Y direction on the writing area shown in FIG. 1. The groups formed are:

(i) *a, c, e, i, m, n, o, r, s, u, v, w, x*
(ii) *b, d, h, k, l, t*
(iii) *g, j, p, q, y, z*
(iv) *f*

The script samples may be classified into the four vertical extent categories in the following manner, referring to the script sample illustrated in FIG. 1. B is selected as a base line and A is identified as an upper guide line such that the group (i) letters fall between the limits A and B. Two additional levels are provided, L and U such that substantially all of group (ii) letters fall between the base line B and the upper guide line U and group (iii) letters fall between the upper guide line A and the lower guide line L. The character *f* in group (iv) occupies the entire writing area between U and L. The four guide lines thus may be considered as quantizing levels and each letter of the script may be identified with these levels and categorized as follows:

(1) If the top of the letter is closer to A than to U, and if the bottom of the letter is closer to B than to L, the letter is a member of group (i).

(2) If the top of a letter is closer to U than to A, and the bottom of the letter is closer to B than to L, the letter is a member of group (ii).

(3) If the top of a letter is closer to A than to U, and the bottom is closer to L than to B, a member of group (iii) is present.

(4) If the top of a letter is closer to U than to A, and the bottom extension is closer to L than to B, a member of group (iv) is present.

(2) SPECIAL MARKS—DOT, CROSS, SLASH

Four letters of the Roman alphabet have separate marks associated with them. They are $i$, $j$, $t$, and $x$. In most cases the dot for $i$ and $j$ is clearly distinguishable as a separate marking and is generally made above the highest point in the associated letter. It is not necessarily well aligned laterally, however. A cross for the letter $t$ is generally an isolated stroke and generally is straight and extends primarily in the X direction. It is usually about half the length of the vertical member of the letter and roughly bisected by it. The slash mark, unique to the letter $x$, generally extends at an oblique angle to the main body of the character and is made as a separate stroke. Since the special marks are generally made as separate motions, that is, after removing the stylus from the writing surface and once again applying it to the surface in a separate motion, these data may conveniently be used in classifying the individual characters.

(3) RETROGRADE MOTIONS

Although written English proceeds monotonically from left to right on a letter-by-letter basis, many individual letters contain retrograde motions. For example, any letter containing a closed loop has a retrograde (right-to-left) portion. Thus a retrograde stroke may be defined as a line segment proceeding in the negative direction with respect to the X axis as defined in FIG. 1. Such marks are always found in letters like $a$ or $o$. There are letters which sometimes are looped as $b$, $l$, or $y$; however, such looping cannot be relied upon since the vertical extensions are often closed into straight lines. Thus there are characteristics of letters which are sufficiently unreliable such that they must be avoided, as well as those which are chosen because of their reliability.

Figure 12:
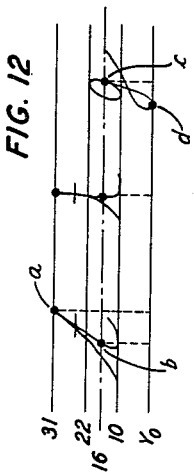
FIG. 12 is a drawing helpful in explaining the extraction of X extremal features of a writing sample.

The alphabet may be divided into eighteen letters which, if well formed, generally have retrograde motions and eight which do not. If the vertical extent groupings of the previous sections are indicated, retrograde motions may be subdivided as follows:

(a) Have retrograde motions (i) $a$, $c$, $e$, $o$, $s$, $x$
    (ii) $b$, $d$, $h$, $k$, $l$
    (iii) $g$, $j$, $p$, $q$, $y$, $z$
    (iv) $f$ (b) Do not have retrograde motions (i) $i$, $m$, $n$, $r$, $u$, $v$, $w$
    (ii) $t$ It is interesting to note that those letters which generally are most confusing in script both for human recognition and for machine recognition are those which do not have retrograde strokes, i.e., those in group (b)–(i) above. It has been found that the value of retrograde strokes in identifying individual alphabetic letters can be materially improved by taking the average letter slant into account. Consider, for example, the simple case of a $t$ which is written so that it is inclined with respect to the vertical (Y axis), or alternatively written without such inclination. An illustration of the two cases is shown in FIG. 12, to be discussed more fully hereinafter.

(4) CUSPS

A cusp is defined as a pointed end or sharp peak in the line trace. Such abrupt changes in line slope are generally found in every letter except $e$, $l$, and $r$, and even these sometimes are given cusps by the writer.

(5) CLOSURE

Closure in cursive written script occurs when a continuous line trace returns to a location previously occupied by the trace thus to form a loop or near loop. The trace need not actually contact the previous location so long as it returns to a location that is sufficiently close to the previously occupied portion. The alphabet can be separated into the following three groups:

(i) Closure always present: $a$, $b$, $e$, $g$, $o$, $p$, $q$, $s$
(ii) Closure never present: $c$, $m$, $n$, $r$, $u$, $v$, $w$, $x$
(iii) Closure sometimes present: $b$, $f$, $h$, $i$, $j$, $k$, $l$, $t$, $y$, $z$ It often happens that closure is effected by two cusps which come together as in $a$ or $g$. In other cases loops are formed by one cusp approaching a line segment as in $d$ or $s$; some letters such as $e$ do not involve cusps. Experience has shown that the presence of cusps and closure and their locations provides information which may be used to provide feature identifying information. Additionally, a count of the total number of cusps is often helpful.

Feature Classification

The table shown in FIG. 6 illustrates the manner by which the five classes of features are subdivided further so that an alphabetic letter may be identified by matching its features, as specified in binary decision form, with a prepared dictionary of binary features that specify the alphabet letters. This does not imply, of course, that each alphabetic letter necessarily requires the twenty-three bits of information shown in the table for specification. To the contrary, the decisions for the several letters are scattered throughout the table and, on the average, only a relatively few of them need be used to identify each letter. In practice, an average of six bits and a maximum of nine bits has been found sufficient to identify each of the alphabetic characters. It should be pointed out that the letter $r$ is illustrated in two different forms in the truth table since it has been found that different writers use the forms with about equal frequency, e.g., with or without a cusp. In the practice of the invention, both forms are accepted but recognized as a single output manifestation.

Storage Apparatus

As the features are detected, their presence and lateral (X) locations are recorded in a temporary storage matrix 35 (in FIG. 3). Storage matrix 35, also energized by mode control 30 for Mode I operation, enters the derived feature data in binary form in individual register cells and retains it for future reference. Thus temporary storage matrix 35 represents the central reference point for all operations. It has for the selected area quantization, two hundred fifty-six columns corresponding to the quantized X direction locations. Thirty rows are sufficient to register for each column, binary decision information denoting detected features and also to provide temporary storage space necessary for the pattern analysis and segmentation operations. A distributor energizes successive columns of the matrix in step with the writing operation so that the active column of the matrix corresponds at any instant to the X position of the stylus on the telewriter. During the subsequent detection modes of operation the distributor is controlled by logical functions in the recognition circuits.

Figure 7:
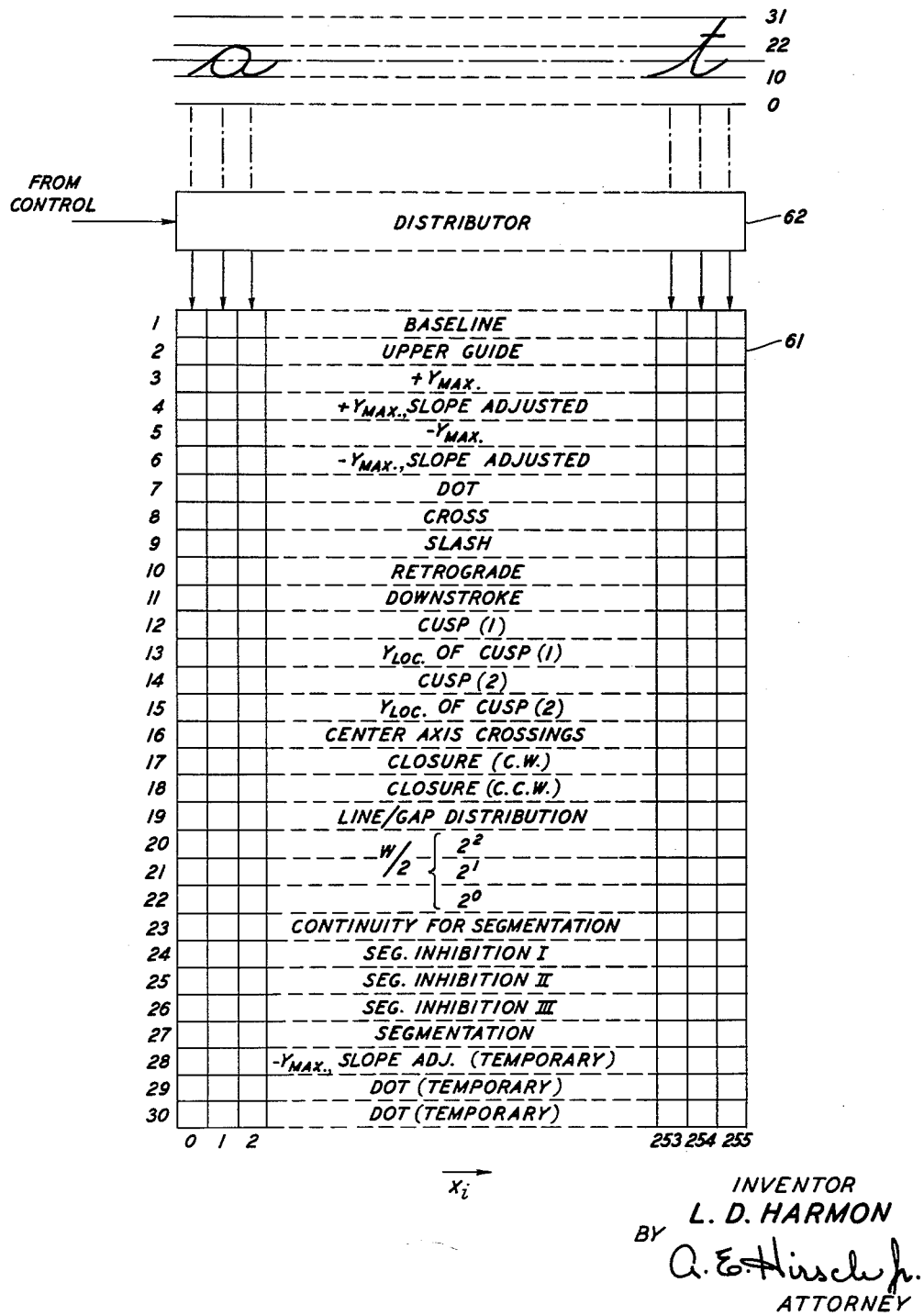
FIG. 7 is a drawing showing the geometrical disposition of storage elements in a register that is suitable for use in the invention.

The organization of the temporary matrix 35 of FIG. 3 is shown in detail at 61 in FIG. 7. It comprises a plurality of individual cells ordered in thirty rows, one for each of the features listed in the table of FIG. 6, and two hundred fifty-six columns corresponding to the matrix of quantizer positions as shown, for example, in FIG. 4. Distributor 62 energized from mode control 30 and influenced by the telewriter, activates one column of the matrix at a time in sequence so that the activated column corresponds to the stylus position. As the columns are momentarily energized by the distributor as it scans in the X direction, the cells in the thirty rows are primed so that binary information may either be written into the cells for storage or, if previously stored, may be read out. Read out is non-destructive but stored information may be destroyed by a "clear" signal.

Distributor 62 may take any form well known in the art. It may comprise, for example, a binary-to-decimal converter whose input is an 8-bit binary number representing $X_i$. Its output is an energized one of two hundred fifty-six separate lines corresponding to the decimal number equivalent of the binary input signal. Storage apparatus 61 may comprise a matrix of logical computer elements arranged in the form shown in FIG. 8. Each matrix row includes a plurality of bistable circuits 70, 71, 72 . . . Each column of the matrix (a total of two hundred fifty-six) contains thirty of the binary circuits. The bistable circuits may be of any desired form and may comprise, for example, conventional flip-flop circuits in which pulses are used to change the state of the device. Thus, the flip-flop may be set to its "One" condition by a positive-going pulse applied to its "On" side, or may be reset to "zero" or "cleared" by a positive-going pulse applied to its "Off" side. Outputs from the flip-flop circuits may be taken from either of the two states; also, information may be derived from a transient change of state. The flip-flops in each column are instantaneously enabled as potentials from distributor 62, are sequentially supplied to them by busses 63 and "AND" gates 64. The appropriate flip-flop in the enabled column is made to change state by supplying a write signal from one of the Write gates 65 through connecting bus 66 to the corresponding AND gate 64. Thus, for example, a signal from the distributor 62 applied to bus 63–0 at the same time that a signal from Write gate 65–1 is passed along bus 66–1 energizes AND gate 64–0 and activates flip-flop 70–1. Subsequent reading of the registered information is achieved by energizing an AND gate 67 by supplying signals both to the appropriate column bus and the appropriate (row) bus 68. Thus to extract the information registered in 70–1, both AND conditions of 67–1 are fulfilled and gate 67–1 transmits the information in flip-flop 70–1 to Read gate 69–1.

FIG. 9 illustrates a modified storage matrix which is arranged to shift information stored in one row to the cells of another row upon a shift command rather than to supply the stored information directly to an output read gate. Register elements of this form are required in storage matrix 61 (FIG. 7) to provide for temporary storage of the information in rows twenty-eight, twenty-nine, and thirty. In the apparatus of FIG. 9, permanent storage row six and temporary storage row twenty-eight are shown. Writing for row twenty-eight and reading for row six takes place as described above. Information written into row twenty-eight is read out however by energizing Transfer gate 83. If flip-flop 84–2 registers a one, for example, and the zero column bus from the distributor is energized, the multiple AND condition of gate 82–1 in row six is fulfilled. Thus the one signal from flip-flop 84–2 in row twenty-eight is shifted to flip-flop 84–1 in row six. Had 84–2 been in the zero state, 84–1 would have remained in its initially cleared-to-zero state.

The register cells both in FIGS. 8 and 9 are cleared upon a command whereby all of the binary elements are returned to their initial zero state condition; ordinary readout is nondestructive. In addition, all cells in a single row of temporary storage, as in row twenty-eight, may be simultaneously cleared to zero by a command from bus 81.

Returning briefly to a consideration of the apparatus of FIG. 3, mode control 30 responds to the two hundred fifty-sixth count of the distributor, as by noting the occupancy of column 255 of the storage matrix 61 (FIG. 7), and terminates Mode I operation and initiates Mode II operation. At this point the temporary storage matrix 61 has registered in a prescribed order all of the detected features of the cursive script pattern written in transducer 20. Before final recognition of the scrip can be made, however, the features must be grouped according to individual English alphabet letter features. Accordingly, Mode II operation is directed toward the segmentation of the input signal into discrete alphabet letters.

Segmentation Apparatus

Segmentation apparatus 22 may be subdivided into five individual operations, 36 through 40 (referring to FIG. 3), each under the control of mode control apparatus 30. Information registered in the storage matrix is made available to each of the segmentation elements (without destroying the stored information) through mode control 30.

Initially, Mode IIA establishes in apparatus 36 the average widths of the individual letters of the script and registers the width information in storage matrix 35. Mode control 30 then initiates Mode IIB operation of apparatus 37. Previously stored information is read out, analyzed to detect the locations of Y excursions of the script, and returned to storage in a form that ultimately is used to divide the connected cursive script into individual letters. In similar fashion, the stored feature information is examined in apparatus 38 for retrograde strokes, during Mode IIC operation. The processed retrograde stroke data is returned to storage. In Mode IID the stored features are examined in apparatus 39 for slash marks, and in Mode IIE dot information helpful in segmenting the script is extracted in apparatus 40 and registered.

At the completion of the Mode II operation, storage matrix 35 contains all of the derived properties of the written script that are required for properly segmenting the script into individual alphabet letters and for recognizing and identifying the individual letters. Mode control apparatus 30 accordingly shifts to Mode III operation. In this Mode the stored features, including segmentation marks, are supplied to comparator 24 wherein they are matched against a set of criteria stored permanently in register 25. The highest correlation of features from storage matrix 35 and register 25 identifies the individual letters. Output circuit 26 may conveniently be a typewritten counterpart of the scrip input.

The details of recognition apparatus 41, including comparator 24, permanent storage register 25 and output circuit 26, form no part of the present invention. These individual elements may follow, in principle, the recognition apparatus elements described in my copending application, Serial No. 795,649, filed February 26, 1959, now U.S. Patent No. 3,050,711, issued August 21, 1962.

DETAILED DESCRIPTION OF APPARATUS

Control of Mode I

FIG. 10 shows in block schematic diagram form the details of mode control apparatus 30. Coordinate signal information $X_i$ from the input circuit 20 and a Start-Write signal are supplied to the circuit. Preferably, the $X_i$ signals are 8-bit binary numbers, each of which represents one of the two hundred fifty-six quantized levels of the writing space. The $Y_i$ signals, each representing one of thirty-two levels, are 5-bit numbers. These signals are fed directly to, or gated into, various sections of the circuit as 8- and 5-bit numbers, respectively. After subtracting and quantizing operations, these representations are reduced to one-bit, yes-no signals. Such one and zero signals are used throughout the system which operates in conventional binary logic. The Start-Write signal clears all of the locations in storage matrix 35 (FIG. 3) to zero, and sets all Mode I logic elements to their initial condition states. Further, the Start-Write signal sets Write-Read flip-flop (hereinafter denoted $f$–$f$ 1001 to one and insures that Request-Recognition $f$–$f$ 1002 is set to zero. The set signal of $f$–$f$ 1001 is delayed for one interval unit in delay line 1003 and used to enable all write gates in rows one through eighteen, twenty-three, twenty-eight, twenty-nine, and thirty, of the storage matrix 35. The delay interval is selected to be long enough that the interacting logic of the various circuit elements have sufficient time to operate thus preventing races and mistiming of logical functions. Further the delay time is chosen to be commensurate with or equal to the automatic pulser periods for Modes II and III. The delay unit interval thus is preferably equal to the distributor pulse unit interval. Gate 1004 is also enabled by the output of delay unit 1003 to pass $X_i$ signals from input 20 through OR gate 1005 to the distributor. Concurrently both the $X_i$ and $Y_i$ signals are continuously made available to all inputs in the recognition circuits that require this information.

Mode I.—Feature Extraction-Details

As writing starts and until a Stop-Write signal is given (for example, when column 255 of the matrix is reached, or when a manual termination signal is produced) the distributor is under the control of the $X_i$ signals from the input transducer. In this mode, local features are extracted and stored in the distributor matrix for future use. The information is handled on a real time basis where real time is measured by the flow of $X_i$, $Y_i$ signals directly from the telewriter or from the intermediate buffer, as desired.

(1) EXTRACTION OF VERTICAL EXTENT INFORMATION

Information related to the vertical extent (Y extensions) of the input signals is supplied to rows one through six and twenty-eight of the storage matrix 61 (for convenience, refer to FIG. 7). The required quantities are measured in terms of the vertical extrema referred to the upper vertical boundaries on the writing surface. They include base line information (B) stored in row one of the matrix, upper guide (A) stored in row two, $+Y_{max}$ (U) stored in row three, $+Y_{max}$ (slope adjusted) stored in row four, $-Y_{max}$ (L) stored in row five, $-Y_{max}$ (slope adjusted) stored in row six, and $-Y_{max}$ (slope adjusted temporary) stored in row twenty-eight. Additionally, information regarding center axis crossings ($Y_{16}$) is stored, as required, in row sixteen of the matrix. It is used in both the feature extracting operations and the segmentation operations.

The script trace is continuously inspected for local vertical maxima or minima, that is, for the detection of peaks. The extremal signals are quantized into one of the above-mentioned four levels, and the quantized signals are stored in the matrix at the $X_i$ column positions corresponding to their lateral locations in the script.

Figure 11:
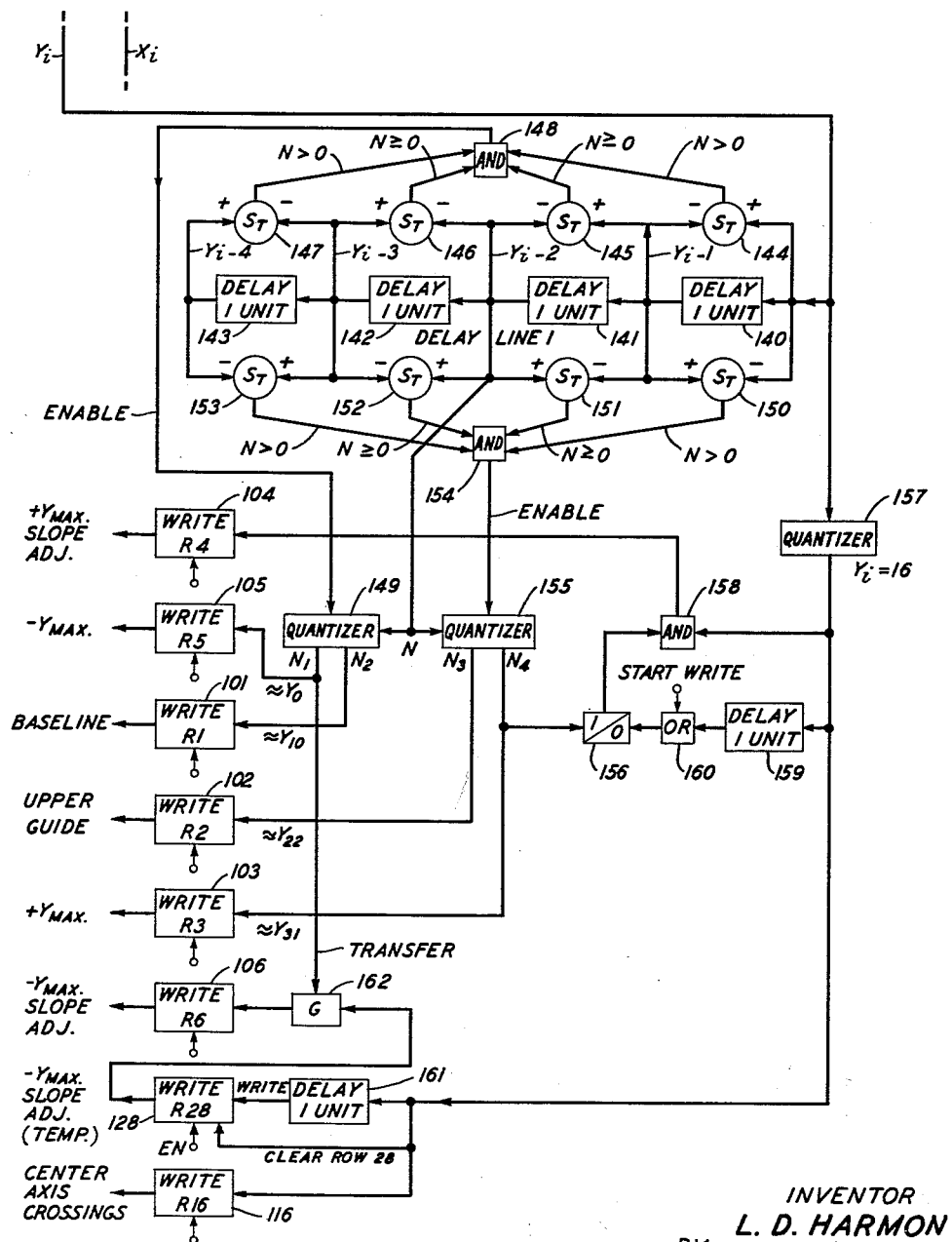
FIG. 11 is a block schematic diagram of apparatus suitable for extracting Y extremal information from cursive script.

FIG. 11 shows by way of a block schematic diagram, apparatus suitable for detecting extremal information of the sort described above, and for enabling Write gates 101 through 106, 116, and 128, corresponding respectively to rows one through six, sixteen, and twenty-eight of the register. The $Y_i$ signals are supplied to a tapped delay line comprising serially connected delay elements 140, 141, 142, and 143, and four subtractions are performed in threshold-subtractors 144, 145, 146, and 147. Such subtractors are well known in the art; they perform the functions both of forming a signal proportional to the difference of the applied signals and of supplying as an output, a "one" or "on" signal only for those difference signals whose magnitudes exceed a pre-established threshold. In practice, a subtractor and a serially connected quantizer may be used to accomplish this function. If $Y_i > Y_{i-1}$ and $Y_{i-1} \geq Y_{i-2}$ and $Y_{i-2} \leq Y_{i-3}$ and $Y_{i-3} < Y_{i-4}$, multiple AND gate 148 is activated and quantizer 149 is enabled. A similar set of subtractions is performed in threshold-subtractors 150, 151, 152, and 153. If $Y_i < Y_{i-1}$ and $Y_{i-1} \leq Y_{i-2}$ and $Y_{i-2} \geq Y_{i-3}$ and $Y_{i-3} > Y_{i-4}$, multiple AND gate 154 is closed and quantizer 155 is enabled. Quantizers 149 and 155 are two-level devices that provide, when properly enabled, signals of one of two alternate values. Thus, for example, when enabled, quantizer 149 provides a first signal $N_1$ of one prescribed amplitude as one output, or a second signal $N_2$ of a second, different amplitude as the other output; quantizer 155 likewise, when properly enabled, quantizes applied signals to two different amplitude levels, $N_3$ or $N_4$.

The enabling of quantizer 149 is in response to a concave-up extremal and the enabling of quantizer 155 denotes a concave-down peak. In either case a decision is made in the enabled quantizer as to the nearest appropriate level reached by $Y_{i-2}$, the peak point which is supplied as input to both quantizers. Thus the signals $N_1$, $N_2$ produced in quantizer 149 represent either $-Y_{max}$ (L) or base line (B), respectively, for concave-up extrema, and the signals $N_3$, $N_4$ produced in quantizer 155 represent either upper guide (A) or $+Y_{max}$ (U), respectively, for concave-down extrema. Whenever a peak occurs the appropriate Write gate 105, 101, 102, or 103 is enabled and the peak is registered by the storage of a one in the $X_i$ location of row five, one, two, or three, respectively, of the matrix. It should be noted however, that the peak indicating signal is recorded at $X_i$ and not at $X_{i-2}$. Hence, it is displaced two locations to the right of the true peak.

Since vertically extended letters are frequently given considerable slope, that is, departure from the vertical, the marks appearing in row three for the $+Y_{max}$ case, for example, may actually be a poor indication of the letters' lateral positions. The letters so affected are $b$, $d$, $f$, $h$, $k$, $l$, and $t$. The nature of normal script is such that if a new mark is made the first time the trace crosses the center line ($Y_{16}$ of FIG. 1) after the $+Y_{max}$ peak, a considerably more accurate positional indication is obtained independent of slope. Accordingly, a slope-adjusted mark is made in row four by energizing Write gate 104. This is done by utilizing the signal $N_4$, that represents $+Y_{max}$, to set $f-f$ 156 to one. The next time that $Y_i = 16$, quantizer 157 emits a signal, and AND gate 158 is closed. Hence Write gate 104 is enabled so that the desired mark is made in row four. After a unit delay, supplied by delay line 159, OR gate 160 is activated, and $f-f$ 156 is reset to zero, so that the initial conditions once again prevail.

FIG. 12 illustrates, in pictorial fashion, the sequence of operations just described. For the letter $t$ written in a slanted fashion, the letter peak ($+Y_{max}$) occurs to the right of the body of the letter (at $a$ in FIG. 12). The peak is registered as a $+Y_{max}$ signal in Write gate 103 in FIG. 11, although this is information not essential to subsequent recognition. The required information is a slope-adjusted indication of the peak. Hence, $f-f$ 156 is set to one, priming AND gate 158. A subsequent center-axis crossing by the script trace on its return stroke is registered in row four via Write gate 104 as the desired slope-adjusted mark. This is indicated in FIG. 12 as point $b$. This adjustment is not required for a letter written without slant, e.g., the second $t$ in FIG. 12, although the described action will still occur.

The same requirement exists for $-Y_{max}$ locating marks as does for $+Y_{max}$ marks. The letters involved here are $f$, $g$, $j$, $p$, $q$, $y$, and $z$. Since the retrace of the script after $-Y_{max}$ does not necessarily return to the lateral center of the letter, but generally intersects the center line $Y_{16}$ at some distance to the right, a somewhat different criterion than that for $+Y_{max}$ is required. Accurate location marks may be derived in this case by recording the $Y_{16}$ intersection ($c$ in FIG. 12) just before the $-Y_{max}$ event ($d$).

Referring once again to FIG. 11, two rows of register elements are required for the slope-adjusting operation on $-Y_{max}$ signals. The operation starts with the signal emitted from quantizer 157 indicating that $Y_i = 16$. This clears all two hundred fifty-six register locations in row twenty-eight, removing all information remaining from preceding operations. Row twenty-eight is utilized as a temporary store for centerline $Y_{16}$ marks. One interval (161) after the clearing occurs, the $X_i$ location of the center line crossing is written into the row. This is the desired $X_i$ mark for a $-Y_{max}$ slope-adjusted indication if it is immediately followed by a $-Y_{max}$ signal. Should another center-line crossing occur before a $-Y_{max}$ signal is encountered, then row twenty-eight is once again cleared, and the X address of the new center-line intersection is entered in temporary storage. If a $-Y_{max}$ signal is encountered before the center line is crossed again, Transfer gate 162 operates to shift the center-line mark previously stored in row twenty-eight to a permanent position in row six by means of Write gate 106.

Each center axis crossing is also permanently registered in row sixteen by means of Write gate 116. This information is used in subsequent operations.

(2) EXTRACTION OF SPECIAL MARK INFORMATION

The detection of special marks such as dots, crosses, and slashes begins with the presence of a spatial discontinuity in either X or Y. Generally a dot, cross or slash is constructed by lifting the stylus and setting it down to make a mark to the left of the lift-off location. This is a retrograde skip in the writing. Even if there are several such marks to be made in a word, they occur principally to the left of the lift-off location since dots, crosses, and slashes are normally constructed after their corresponding letters. Detection of a "jump" to the left is sufficient to identify dots and crosses; additional allowance must be made for a slash mark since this mark is generally started above the jump-off location but may be either to the left or to the right. It is required that a jump to the right is in itself not sufficient to operate the system because such a discontinuity occurs for every interword spacing and intraword gap.

Figure 13:
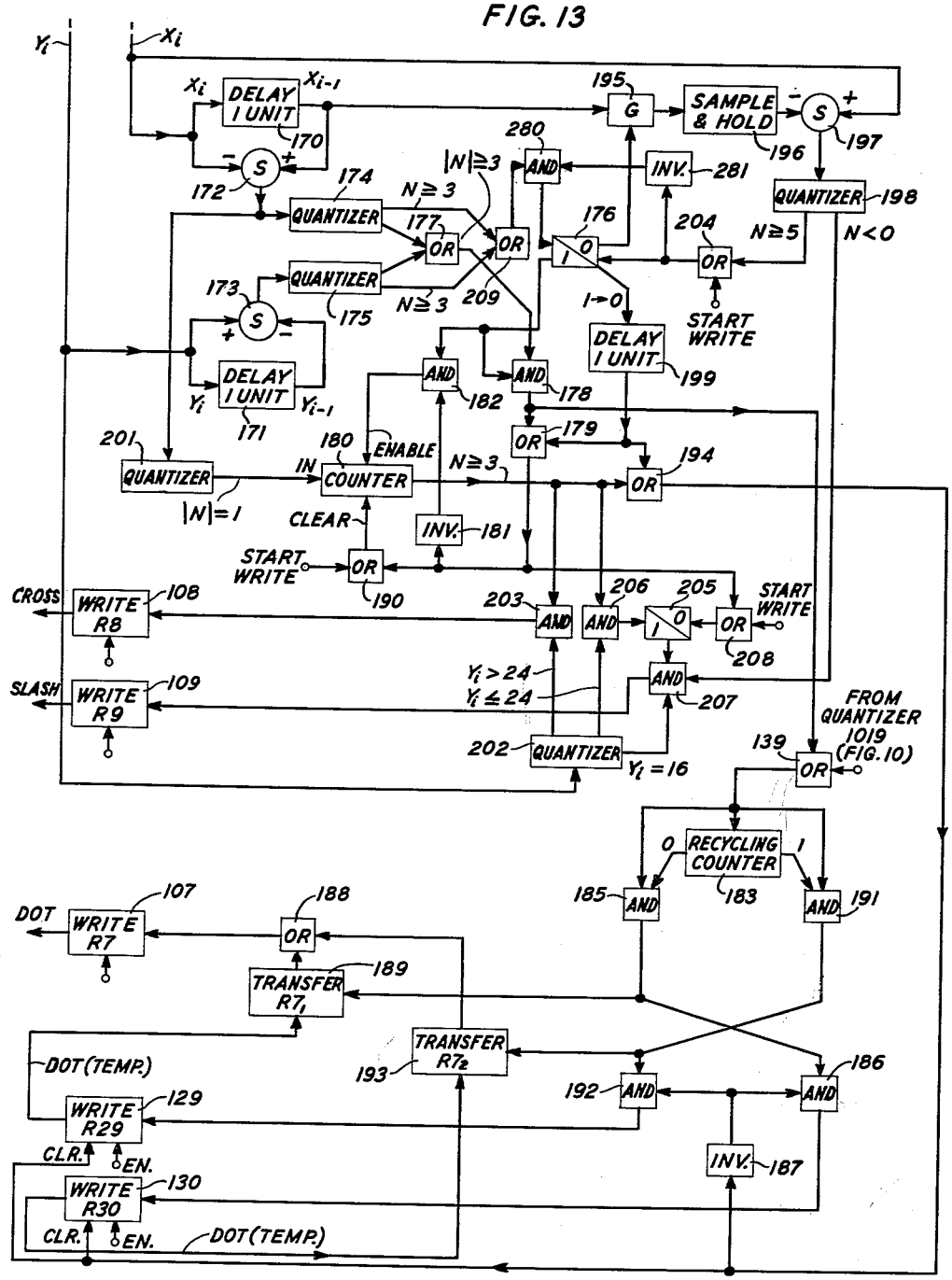
FIG. 13 is a block schematic diagram of apparatus suitable for extracting dot, cross, and slash information from cursive script.

(a) *Dot.*—Details of apparatus suitable for detecting dot marks are illustrated in FIG. 13. Coordinate signal information $X_i$, $Y_i$, from input circuit 20 and a Start-Write signal are supplied to the circuit. $X_i$ signals are delayed in unit delay element 170 and $Y_i$ signals are retarded in delay element 171 to produce at the output of subtractors 172 and 173, respectively, signals equal to $X_{i-1}-X_i$ and $Y_i-Y_{i-1}$. The difference signals are applied to quantizers 174 and 175, each with a threshold of three; i.e., the quantizers emit output signals whenever a change of three levels occurs in either X or Y. If either $X_{i-1}-X_i \geq 3$ (left-going jump), or $Y_i-Y_{i-1} \geq 3$ (up-going jump), $f$-$f$ 176 is set to one via OR gate 209 and AND gate 280. The function of 280 is to insure that under certain conditions where a set-to-zero command is present on $f$-$f$ 176, the set-to-one command is initiated. This is mediated via inverter 281. OR gate 177 is also enabled at this time; however, its response is to quantizer outputs of $|N| \geq 3$, i.e., to jumps of $\geq 3$ spaces, either up, down, left, or right. The one state of $f$-$f$ 176, together with a signal from OR gate 177, produces two results. First, the enabled AND gate 178 passes a signal through OR gate 179 to clear counter 180 by way of OR gate 190. A Start-Write signal, when present, also clears counter 180 through OR gate 190. An inverter 181 from the clear bus of this counter to the enable bus via AND gate 182 opens gate 182 to disable counter 180 during the clearing operation. The second result of the initiating jump signal is that recycling counter 183 is activated via AND gate 178. Since the jump signal is transient, the counter changes state from one to zero or from zero to one, depending on its previous condition. The function of this recycling counter is to make alternate use of two temporary storage rows in the matrix, twenty-nine and thirty, for the dot detecting operations. Since a left-going or up-going jump may indicate either a dot, cross, or slash, temporary registration is required until a decision can be made. If a dot is detected, a shift is made from a temporary to the permanent storage row. If the jump has been made for a cross or a slash, the temporary dot storage row is cleared out. Two such rows are required to preserve the relevant information if two or more marks are encountered in the same word. One row receives information while information in the other is being processed.

If the jump signal drives counter 183 to the zero condition, the path through AND gate 185 is closed, potentially enabling temporary storage of dot information via Write gate 130, through AND gate 186. The second enabling condition of AND gate 186 is the absence of a clear signal from OR gate 194. If a clear signal is present, inverter 187 inhibits AND gate 186. As will be seen, a dot does not cause such a clear signal to be present. In the absence of a clear signal, AND gate 186 allows a mark to be made in row thirty by means of Write gate 130, indicating that a jump has occurred at the X position indicated.

This information continues to reside in row thirty either until it is transferred into permanent storage in row seven via transfer gate $R$-$7_2$, or until it is destroyed by a clearing operation. If the jump has been made for a dot, the next signal is another jump, either to another dot, cross, or slash mark in the same word, or to start a new word. If the jump is made for another mark, the new jump location occurs to the left of the initial jump-off location. On the other hand, a jump to begin a new word requires an X position to the right of the initial location.

It is required that the X value denoting the initial jump-off location be temporarily stored. This is done at the time that flip-flop 176 is set to one. Since $X_i$ represents the "jumped-to" position at this time, $X_{i-1}$ represents the "jump-off" position. Consequently as $f$-$f$ 176 is set to one, gate 195 is disenabled, freezing the desired $X_{i-1}$ information in the sample-and-hold circuit 196. This quantity is compared with $X_i$ in subtractor 197 and, so long as $X_i-X_{i-1}<5$, as established by quantizer 198, OR gate 204 is not energized and $f$-$f$ 176 remains in the one condition. Thus, unless the script trace goes to the right of the jump-off location by at least five spaces, (selected to represent one-half of a typical letter width), $f$-$f$ 176 remains in the one condition and allows the dot, cross, slash operations to proceed.

There are several possible responses of the dot detector to the jump signal. Either the jump does not indicate a dot, or if it does, it is the only special mark in the word. Alternatively, it may be one of several. Further, if the dot is the only mark in the last word to be written, then there are no more jump signals, since the stylus will be lifted after the dot is made. The indication of the mark is thus left in temporary storage.

If the script mark is a cross or slash, counter 180 begins to be augmented from its initially cleared state. Quantizer 201 provides input counts for 180 as long as $|X_i-X_{i-1}|=1$; i.e., the counter responds to unit increments in the script trace (either right-going or left-going) but not to jumps. A dot that occupies several locations, i.e., a poorly defined one, may enter a count of one or two in counter 180. However, a count of three or more is presumed to have been caused by a more extended line, i.e., a cross or slash. In the latter case, OR gate 194 is used to clear both of the dot temporary storage registers, destroying the erroneous dot indication.

If the mark is a dot and it is the only special mark in the word, the trace jumps again to the right in order to continue with the succeeding word. Accordingly, the new jump signal advances counter 183 to a count of one. As a consequence Transfer gate 193 is enabled via AND gate 191, and the temporary dot indication in row thirty is transferred into permanent storage via OR gate 188 and Write gate 107. This is the desired dot information.

Figure 14:
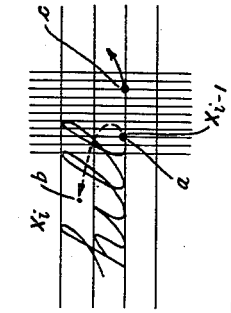
FIG. 14 is a drawing helpful in explaining the apparatus employed for detecting special marks in a written sample of script.

FIG. 14 illustrates pictorially the sequence of events just described. In writing the word "*hill*," the stylus normally leaves the writing surface at a point following the second letter *l*, and returns to the surface at a position generally above and near the letter *i* (point *b*). If the mark made at *b* is sufficiently short in length and the stylus then lifts to go to point *c*, for example, to write a new word, the dot information is put into permanent storage via Write gate 107. The jump signal generated as the stylus moves to start a new word also puts a temporary mark into row twenty-nine via Write gate 129. However, this is immediately erased since $f$–$f$ 176 is reset to zero as a result of the present jump. The trace resumes at point $c$ substantially to the right of the original jump-off location which has been retained by the sample-and-hold circuit 196. Consequently subtractor 197 delivers an appropriate signal to quantizer 198 which responds via OR gate 204 to set $f$–$f$ 176 to the zero state.

The information denoting that $f$–$f$ 176 has been reset to zero is delayed one interval (199) to permit data in the temporary storage registers to be used, and utilized to then clear those registers for future use. Counter 180 is also reset to zero at this time, via OR gates 179 and 199. This counter and both temporary dot storage operations are inhibited from being used when clearing signals are present. This is accomplished by inverters 181 and 187, respectively.

If the script mark is a dot and is the only special mark in the last word of the input data, no second jump is available to shift the temporary indication from row thirty to row seven. This is accomplished by the Stop-Write signal which provides a synthetic jump signal to counter 183 via OR gate 139. The Stop-Write signal is derived from the mode control (FIG. 10) and signifies the end of the writing phase (Mode I) and the start of subsequent operating modes.

Finally, if the second jump is made to the left rather than to the right of the initial jump-off location, at least two special marks are presumed to be present. If the first one had been a dot, its address is permanently stored at the time that the second jump is registered by OR gate 177, as described. If the second mark is also a dot, then its location is temporarily gated into row twenty-nine via AND gate 192, since counter 183 has been stepped to register one by the second jump. Had either of the two marks been a slash or cross rather than a dot, the action differs as described in the following sections. Since the circuits between each of the two outputs of counter 183 and Write gates 129 and 130 are symmetrical, the starting count in 183 is immaterial. Consequently, the described series of events for dot detection are the same if 183 begins in the opposite state.

(*b.*) *Cross.*—The same sequence of events described above in dot detection occurs until the script mark covers at least three quantized positions on the writing space. In general, a dot covers less than three positions but a cross covers more than three. A typical letter $t$ cross, for example, covers as many as ten or fifteen locations. It therefore continuously advances counter 180 through quantizer 201. Quantizer 201, at the input of this counter, insures that unit changes from one X location to another in sequence are counted, rather than jumps in $X_i$; since the counter responds to signals regardless of their absolute magnitude, it is unimportant whether the cross is made from left to right or right to left. When counter 180 reaches the count of three, the spurious indication of a dot written in the interim in row twenty-nine or row thirty is cleared out. This prevents such information from being gated by a subsequent jump signal into row seven, erroneously indicating a dot instead of, or in addition to, a cross mark. The count of three accumulated on counter 180, in conjunction with output of quantizer 202 indicating $Y_i > 24$ (a vertical threshold for a $t$ cross) enables AND gate 203 so that a one is written by means of Write gate 108 in row eight. A sequence of ones continues to be written into the row so long as the trace continues.

Should the stylus now be lifted to produce a jump to five or more locations to the right of the initial jump-off location, $f$–$f$ 176 is reset to the zero state by the signal emitted from quantizer 198 passed through OR gate 204. After a one unit delay (199), counter 180 is cleared so that it is ready for new action.

Should the script not jump to begin a new word but instead jump to another location, still to the left of the initial jump-off location, another special mark is made. If it is a cross, the action is as described above. First, the new jump indication is delivered by OR gate 177 to AND gate 178 and OR gates 179, 199 to clear counter 180. As the new cross mark is made, the events are identical to those described for the first mark. Should the second mark be a dot, its detection and storage would occur as described. The first mark may be a dot and the second a cross, hence, the system will process dots and crosses in any sequence.

(*c*) *Slash.*—Operations for the detection of slash marks are the same as those for the detection of cross marks described above until counter 180 (FIG. 13) emits a count of three. Since the slash mark for an $x$ generally lies within the bounds A and B (vertically central area of the writing space) of FIG. 1, a distinction is readily made from cross marks which typically lie above A, the upper guide. Hence the presence of a line rather than a dot, as signalled by $N \geqq 3$ from counter 180, is taken in conjunction with $Y_i \leqq 24$ derived from quantizer 202. The presence of both conditions enables AND gate 206 to set $f$–$f$ 205 to the one state.

The approximate lateral center of the slash mark is identified by recording the $X_i$ location of its intersection with the center axis. Hence, the next crossing of the center axis by the script trace, following the start of the slash is noted. This provides the second condition on AND gate 207, the first having been produced by the one state of $f$–$f$ 205. The third condition, provided by quantizer 198, insures that no slash record is made if the trace lies to the right of the jump-off location. This prevents possible spurious indications in the case of up-going jumps created in progressing from one word to another in normal sequence. (Such jumps, if shorter than five lateral spaces in length, set $f$–$f$ 176 to the one state via quantizer 175. This $f$–$f$ is, of course, reset to zero as soon as the trace travels five spaces to the right of the jump-off position.) When all three enabling conditions are present on AND gate 207, a record of the slash is made in row nine via Write gate 109. Since the trace normally makes another jump before crossing $Y_i = 16$ again, only this single mark is made in row nine. $f$–$f$ 205 is reset to its zero condition by any subsequent jump, through OR gate 208, as counter 180 is also cleared. Consequently, the dot, cross, and slash detections may be made in any sequence or quantity. As before, if the jump following a slash mark is sufficiently to the right of the initial jump location, $f$–$f$ 176 is reset to zero and the circuits are returned to their initial conditions.

(3) EXTRACTION OF RETROGRADE SEGMENT INFORMATION

Figure 15:
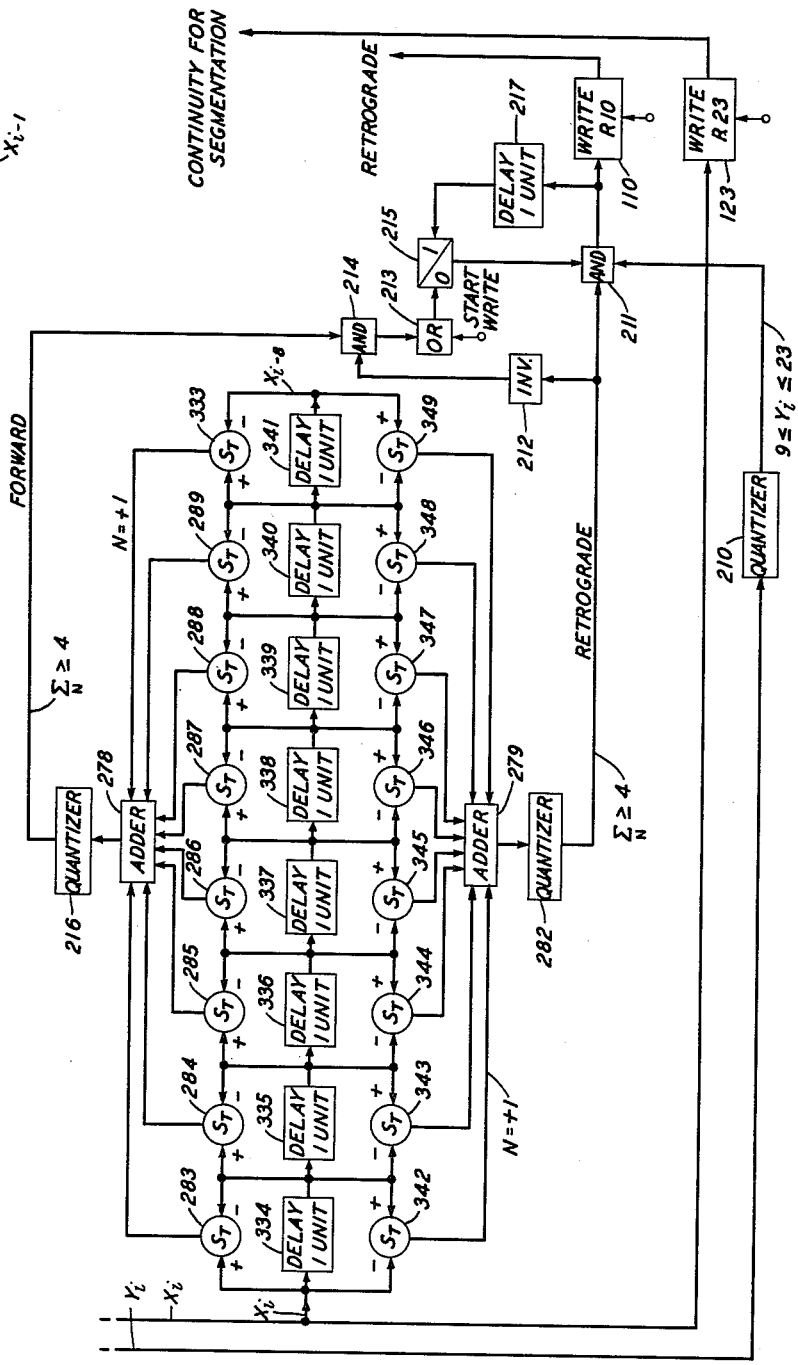
FIG. 15 is a block schematic diagram of apparatus suitable for extracting retrograde motion and continuity information from cursive script.

Apparatus for detecting retrograde segments is shown in FIG. 15. As before, $X_i$, $Y_i$, and Start-Write information is provided to the circuit apparatus. Since it is necessary to inspect for retrograde segments only in approximately the middle (vertical) third of the writing space, a quantizer 210 is provided to pass only $Y_i$ information lying in the intervals nine through twenty-three. This information is supplied to one input of a multiple AND gate 211. The basic criterion for a retrograde stroke is that the script trace moves generally from right to left over a span of at least half a letter width. The delay line of FIG. 15, comprising unit delays 334 through 341, in conjunction with the lower row of subtractors 342 through 349 provide the required information. A signal output is obtained from any subtractor that has a +1 difference applied to its inputs, i.e., for $X_{i-1} - X_i = 1$. This denotes a left-going change of one quantal space at the location indicated. If there are at least four such retrograde increments in any eight consecutive samples, adder 279 allows quantizer 282 to produce an output signal, signifying the presence of a retrograde stroke. This criterion provides protection against noise or erratic waver in the script. In a similar manner, the upper row of subtractors, adder 278 and quantizer 216 produce a signal indicative of a generally forward-going trace.

The controlling flip-flop 215 is initially primed to the zero state by the Start-Write signal, operating through OR gate 213. Thus, when a retrograde signal is developed by quantizer 282, all of the required conditions are present to cause AND gate 211 to emit a signal. This results in an entry in row ten of the storage matrix via Write gate 110, signifying the presence of a retrograde stroke. Unit delay 217 allows this entry to be made before setting flip-flop 215 to one, which disables AND gate 211. Consequently a single mark in row ten represents the retrograde stroke. Its $X_i$ location lies between four and eight spaces to the left of the beginning of the stroke; this, on the average, is a reasonably accurate indication of the center of the letter being tested.

The circuit is not restored to normal until the script trace is well past the retrograde section just marked. Thus a forward signal from quantizer 216 sets flip-flop 215 to its primed or zero state via AND gate 214 only after the retrograde section has been passed and inverter 212 permits AND gate 214 to function.

$X_i$ signals as shown in FIG. 15 are also employed to supply one signal via Write gate 123 to row twenty-three in the register as an indication of signal continuity. This information is utilized in the apparatus to be described hereinafter.

(4) EXTRACTION OF DOWN-STROKE INFORMATION

Figure 16:
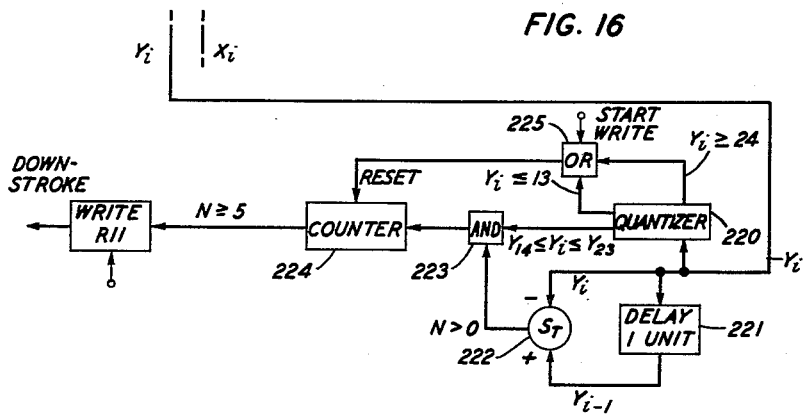
FIG. 16 is a block schematic diagram of apparatus suitable for extracting down stroke information from cursive script.

Apparatus for detecting down-strokes in the writing process is shown in FIG. 16. $Y_i$ signals from input transducer 20 are supplied to a quantizer 220, a one unit delay element 221, and to the minus input of threshold subtractor 222. The output of subtractor 222 is a one if $Y_{i-1} > Y_i$ (i.e., the trace is down-going between two consecutive samples); it is supplied as one input of the AND gate 223.

A down-stroke may typically be readily detected in the upper middle portion of the writing space. The requirement that the trace lie between levels fourteen and twenty-three inclusive is obtained by quantizer 220. Thus, if a down-going step occurs in this range, counter 224 is advanced one count. Five such steps are required for a down-stroke detection. An adequate count out of 224 causes Write gate 111 to enter the required information in row eleven. This process continues for the duration of the down-stroke until the trace leaves the designated band, i.e., $13 \geq Y_i \geq 24$. At this time, AND gate 223 is disabled and counter 224 is reset. The limits of this band are set to avoid recording the transitions from vertical to lateral progression of the trace, while maximizing the extent of vertical stroke that can be accurately marked.

(5) DETECTION OF CUSPS

It is helpful to consider the definition and various examples of cusps before the apparatus employed to detect them is presented. A cusp is defined as a pointed end or sharp peak in the line trace. Eight forms of cusps are shown in pictorial form in rows A and B of FIG. 17. Each cusp is also represented by a pair of equivalent vectors. The short vector at each origin indicates the direction of the initial stroke in the cusp. Rows C and D depict quantized representations of various forms of the sharp peak of case 1 in row A. Row D is an enlarged version of row C and shows the levels to which the trace is quantized. In case D1, an actual retracing of the line occurs; therefore, it is necessary only to detect that $X_6 - X_4 = 0$ and that $Y_6 - Y_4 = 0$. Similarly, for any other orientation of three consecutive points, if $X_i = X_{i-2}$ and $Y_i = Y_{i-2}$, then $X_{i-1}$ and $Y_{i-1}$ are found at the tip of a retracted line. In the example D2 where the cusp subtends an angle that is not zero, but instead spreads out, it will be noted that $X_6 - X_4 = 1$, and that $Y_6 - Y_4 = 0$. It is obvious that either $X_6 - X_4 = 0$, or $Y_6 - Y_4 = 0$ is a sufficient condition for detection of a peak or cusp. However, in the example D3 where the cusp approaches a right angle, it will be noted that $X_6 - X_4 = 1$ and $Y_6 - Y_4 = 1$. Accordingly, this information is insufficient to define a cusp because a gently curved line as shown, for example, in D4 can produce the same quantal information. However, if additionally it is required that the slope following the presumed cusp is different in sign from the slope preceding the presumed cusp, the fact that D3 is cusped or peaked and D4 is not is readily distinguished. This is equivalent to the statement that a trace has a cusp if either the X or Y trace direction is reversed abruptly. In the instant example the reversal occurs within three quanta. It is thus in accordance with the present invention to examine further the quantized signal samples on both sides of a presumed cusp so that the additional slope criteria may be used to identify the cusp positively. For example, in the examples in row D of FIG. 17, if an examination of points 4, 5, and 6 indicate the possibility of cusp being present, it is recognized that the criteria may not actually define a cusp. Accordingly, points 6 and 7 are also examined and the slope defined by the points is compared with the slope of the signal defined by points 4 and 5. If the slopes have different signs, a cusp is identified, whereas if the slope changes magnitude only but not sign, the presumed slope information is ignored. The criteria given above are sufficient to identify any angle less than 90 degrees as a cusp.

Figure 18:
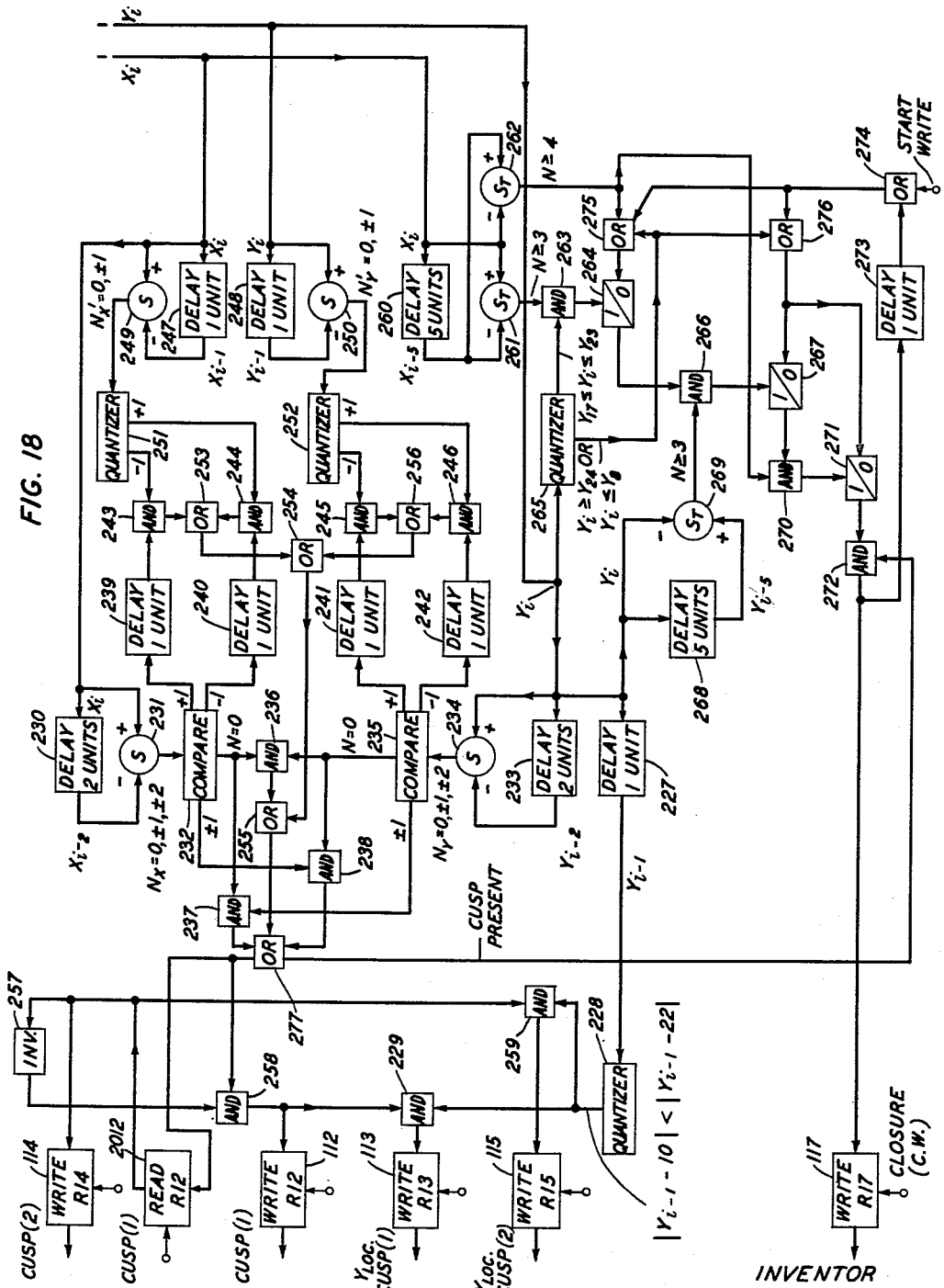
FIG. 18 is a block schematic diagram of apparatus suitable for extracting cusp and closure features from cursive script.

The cusp detector then requires that:

(1) $\begin{pmatrix} X_i - X_{i-2} = 0 \\ \text{and} \\ Y_i - Y_{i-2} = 0 \end{pmatrix}$ or (2) $\begin{pmatrix} X_i - X_{i-2} = 0 \\ \text{and} \\ Y_i - Y_{i-2} = \pm 1 \end{pmatrix}$ or (3) $\begin{pmatrix} X_i - X_{i-2} = \pm 1 \\ \text{and} \\ Y_i - Y_{i-2} = 0 \end{pmatrix}$ or (4) $\begin{pmatrix} X_i - X_{i-2} = \pm 1 \\ \text{and} \\ Y_i - Y_{i-2} = \pm 1 \end{pmatrix}$ and $\begin{pmatrix} X_{i+1} - X_i = \mp 1 \\ \text{and} \\ Y_{i+1} - Y_i = \mp 1 \end{pmatrix}$ Referring now to the block schematic diagram shown in FIG. 18, $X_i$, $Y_i$ and Start-Write information are supplied to the various units from input transducer 20. The $X_i$ and $Y_i$ signals are each delayed by two unit intervals in delay elements 230 and 233, respectively, and the differences, $X_i - X_{i-2}$ and $Y_i - Y_{i-2}$, are formed, respectively, in subtractors 231 and 234. Thus, each difference may be 0, $\pm 1$, or $\pm 2$ for a continuous script trace. The zero, plus one, and minus one results are those of interest. They may be called $N_x$ and $N_y$ for convenience. Signals $N_x$ and $N_y$ are supplied, respectively, to comparators 232 and 235 wherein the magnitudes of the differences are established. If $N_x$ and $N_y$ are 0, 0; or 0 $\pm 1$; or $\pm 1$, 0 respectively, then the corresponding AND gates 236, 237 or 238 enable Read gate 2012 via OR gate 277. This satisfies either condition 1, 2, or 3 in the table given above. Read gate 2012 has access to signals previously marked in row twelve of the register and provides an indication of wether or not a cusp has previously been detected at this (the instant) X location.

Figure 17:
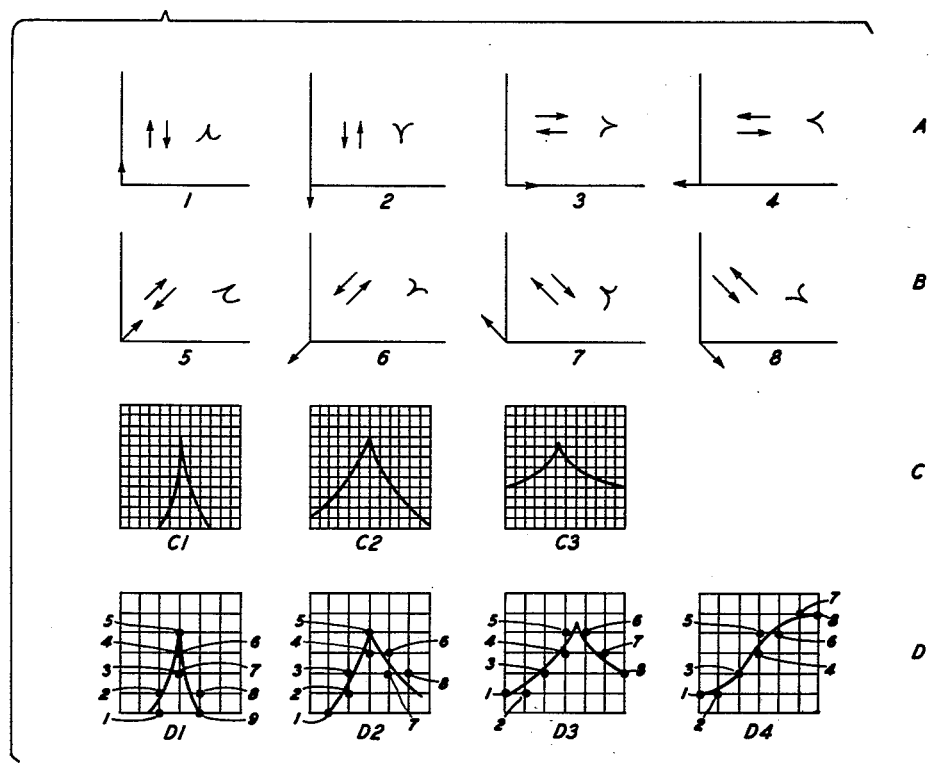
FIG. 17 is a set of drawings helpful in explaining the extraction of cusp-like features from writing samples.

Consider the fourth condition in the above table, the case in which $N_x = N_y = \pm 1$ (illustrated at 1D in FIG. 17). It is necessary to examine additional points for this condition to determine the nature of the slope change in the vicinity of the cusp.

In the apparatus of FIG. 18, if the outputs of comparators 232 and 235 differ either by ±1 or −1, a forty-five degree slanted line is indicated, and it is necessary to show that $Y_7-Y_6$ (shown in D3 of FIG. 17) is different in sign from $Y_6-Y_4$ to identify the cusp positively. In order to advance the examination to the seventh point, delay lines 239, 240, 241, and 242 are employed. Accordingly, if Y was increasing as it advanced from $Y_4$ to $Y_6$, and if in going from $Y_6$ to $Y_7$ it was decreasing, then Read gate 2012 is energized. Correspondingly, if $Y_4$ was decreasing in advancing to $Y_6$, but was increasing in advancing from $Y_6$ to $Y_7$, the Read gate is energized. Similar considerations hold for X difference signals.

These operations start with signals which are provided by comparators 232 and 235 for $N_x=+1$ and $-1$ and for $N_y=+1$ and $-1$. These signals are passed, respectively, through one unit delay elements 239, 240, 241, and 242. The slope of the portion of the trace following the presumed cusp is established by passing the $X_i$ and $Y_i$ signals through unit delay elements 247 and 248 and comparing the output signals with the undelayed signals in subtractors 249 and 250, respectively. The difference signals, which may be either 0 or ±1 are identified for convenience as $N_x'$ and $N_y'$. Signals $N_x'$ and $N_y'$ are supplied respectively to quantizers 251 and 252 wherein the magnitudes of the differences are established, and the appropriate signal line is energized. Accordingly, if $N_x$ (delayed by delay units 239 and 240) and $N_x'$ are of opposite sign, or if $N_y$ (delayed by delay elements 241 or 242) and $N_y'$ are of opposite sign, then one of the AND gates 243, 244 or 245, 246 will emit a signal indicating the detected difference in slope. In the former case, that is, AND gate 243 or 244 becoming energized, OR gates 253, 254, 255, and 277 are energized so that Read gate 2012 is enabled. Similarly, if either AND gate 245 or AND gate 246 is energized, indicating a change of slope in the Y direction, OR gates 256, 254, 255, and 277 are enabled to activate Read gate 2012.

Action following the enabling of Read gate 2012 by any of the above-mentioned conditions is as follows: if a one had not previously been written in row twelve, signifying a cusp at the instant X location, a zero from Read gate 2012 is inverted in inverter 257 to allow AND gate 258 to utilize Write gate 112 so that the instant cusp may be recorded in row twelve. However, there may be two different cusps at one $X_i$ location, e.g., for the letter $a$. This possibility is shown in the two script samples of the letter $a$ in FIG. 19. If one cusp has already been detected and written in row twelve, Read gate 2012 emits a one, thus energizing Write gate 114 to write a one in row fourteen (illustrated in FIG. 19) and de-energizes Write gate 112 by way of inverter 257 and AND gate 258. It should be noted that the $X_i$ location recorded in row twelve or row fourteen is precisely at the cusp $X_i$ location for the example shown at C1 of FIG. 17, but will be at the $X_{i+1}$ location for the cusp of example C2, and will be at $X_{i+2}$ for the example C3. If it is desired to reduce the two latter locating errors to zero, it is necessary only to use the information identifying the source of the Read gate 2012 enabling signal, i.e., the pertinent AND gate that was used to enable gate 2012 must be identified so that a mark will be made instead at $X_{i-1}$ or $X_{i-2}$, either in row twelve or row fourteen of the matrix. This is conveniently done by using two temporary rows of matrix storage, one displaced to the right by one space and the other to the right by two spaces. After storing in either position 12a or 14a, a transfer into rows twelve or fourteen installs the one signal at the desired location.

One further bit of information is required to complete the identification of the cusp feature, namely, it must be known whether the cusp is closer to the base line than to the upper guide line. Consequently, a signal $Y_{i-1}$ is produced by passing input $Y_i$ signals through a one unit delay element 227, and applying the delayed signal to a quantizer 228. Quantizer 228 generates a one signal if the magnitude of $Y_{i-1}-10$ is less than the magnitude of $Y_{i-1}-22$, and a zero signal for all other cases. This information is written into row thirteen by energizing AND gate 229 to enable Write gate 113 if the corresponding storage was via row twelve; otherwise it is registered by energizing AND gate 259 and Write gate 115, i.e., in row fifteen.

(6) DETECTION OF CLOSURE

For satisfactory recognition, closure of two kinds must be identified; one is formed by clockwise progression of the trace as in the handwritten form of the letters $s$ and $p$, while the other closure is counterclockwise as in handwritten letters $a$, $o$, and $g$.

(a) *Clockwise closure.*—Identification of clockwise closure found, for example, in letters $s$, or $p$ can be obtained by detecting a clockwise sequence, for example, up, right, down, and left, and noting that the left, retrograde portion terminates in a cusp. However, for some handwritten samples of the letter $s$, there may not be a dependable up-going signal to start with, so that this requirement cannot be used. Also some excessively slanted letters, like $m$, $n$, or $r$ include the sequence right, down, and left followed by a cusp. False identification of closure in these cases is avoided by requiring a minimum extent for the left-going or retrograde segment. A satisfactory criterion is that $|-\Delta X| \geq 4$. This quantity can be adjusted for maximum rejection of $m$, $n$, and $r$ and a maximum acceptance of $s$ and $p$. Requiring a net difference of at least three Y quanta within five spaces insures that a satisfactory minimum vertical trace length is detected. This requirement provides some assurance that the radius of curvature of the closure trace is not minutely small.

Referring now to FIG. 18, $X_i$ signals are delayed five unit intervals in delay unit 260 and compared with the signal $X_i$ in threshold-subtractors 261 and 262. In essence, the difference signals are subjected to threshold levels of 3 and 4, respectively, established within the devices. If a right-going segment is detected that is, if $X_i-X_{i-5}\geq 3$ within the vertical bounds of levels seventeen and twenty-three, AND gate 263 is potentially enabled. Quantizer 265 supplied with $Y_i$ signals, energizes AND gate 263 only for those $Y_i$ signals that fall within the range of $Y_{17}$ through $Y_{23}$; thus a right-going segment lying within these limits sets f–f 264 to one. Should the enabling of f–f 264 be followed by a down-going segment, defined by $Y_{i-5}-Y_i\geq 3$, AND gate 266 is enabled and f–f 267 is set to one. The down-going segment is detected by passing $Y_i$ input signals through five unit delay element 268 and comparing it in threshold subtractor 269 with $Y_i$. The output signal that exceeds the threshold of 3 is supplied as the second enabling input to AND gate 266. If next an $X_{i-5}-X_i\geq 4$ signal is detected in threshold subtractor 262, the presence of a trace proceeding to the left is indicated. Accordingly, the one signal from f–f 267 and the signal from threshold subtractor 262 are sufficient to enable AND gate 270 thus to set f–f 271 to the one condition. If a signal is also generated by the cusp detecting circuit, AND gate 272 is enabled and Write gate 117 is energized to write a one into row seventeen of the matrix. This signifies clockwise closure at the indicated $X_i$ location of the cusp.

After a unit delay (delay element 273), the closure signal is passed through OR gate 274 and employed by way of OR gate 275 to reset f–f 264 to zero, and passed by way of OR gate 276 to reset f–f 267 and f–f 271 to zero. The circuit is thus ready for the next closure detection. It should be noted that if a right-going segment had been followed by a left-going segment before a down stroke was encountered, f–f 264 would have been reset to zero immediately to inhibit further action. Further if at any time the trace exceeds the vertical bounds by assuming a Y value of less than nine units or greater than twenty-three units, both f–f 264 and 267 are reset to zero thus inhibiting spurious responses.

(b) *Counterclockwise closure.*—A retrograde stroke provides sufficient information for the start of a counterclockwise series; this marks the beginning of the *a*, *o*, and *g* class of closure patterns. The sequence that follows must then be down, right, and up. Finally, as the line trace returns to the upper (starting) portion of the writing space, it must lie within a prescribed distance from the beginning of the loop. If it does, it may be said that closure exists.

The counterclockwise closure detection process is carried out by the apparatus shown in FIG. 20. It is initiated by setting f–f 290 to one. This event occurs if $X_{i-5} - X_i \geqq 3$ is detected (indicating a retrograde stroke), and if $Y_1$ lies between nineteen and twenty-four (indicating that the stroke starts near the upper guide line).

If next, a down-going trace is encountered $$(Y_{i-5} - Y_i \geqq 3)$$

as established by passing $Y_1$ signals through the five unit delay elements 295 and deriving a suitable difference signal from threshold subtractor 296, one condition for the enabling of AND gate 297 is fulfilled. The other condition is established by a one signal from f–f 290. With both conditions fulfilled, AND gate 297 is energized and f–f 298 is consequently set to the one position. Should the trace now proceed to the right ($X_i$ is greater than $X_{i-5}$ by at least 3 levels) as established in threshold subtractor 299, AND gate 300 is enabled and f–f 301 is set to one. Finally, if an up-going segment next occurs $$(Y_i - Y_{i-5} \geqq 3)$$

threshold subtractor 302 produces a signal that, together with the one signal from f–f 301, closes AND gate 303 to set f–f 304 to the one condition. Thus the left, down, right and up sequences are detected, and as a consequence f–f 304 primes the succeeding circuit for closure detection.

It should be noted that had there been a right-going signal before a down-going signal, f–f 290 would have been reset to zero by a signal supplied to OR gate 305, inhibiting further action of this chain of events. Similarly, an up-going signal is sufficient to reset f–f 298 to zero through OR gate 306, and a left-going signal is sufficient to return f–f 301 to zero through OR gate 307. In like fashion a down-going signal sets f–f 304 to zero through OR gate 308. In each case a sequence other than left, down, right, and up precludes the eventual enabling of f–f 304. Further, should the trace leave the approximate center of the writing area, that is, if the $Y_1$ signals falls outside the range of eight through twenty-four, all of the flip-flop circuits are reset to zero. This condition is handled by passing input $Y_1$ signals through quantizer 309, set to respond only to signals outside of the specified range. A $Y_1$ level less than eight or greater than twenty-four causes quantizer 309 to emit a signal which is passed through OR gate 310 to OR gates 305, 306, 307, and 308, thus to return the corresponding flip-flops to their zero conditions.

Another series of events is initiated as f–f 290 is set to the one condition. This comprises a mechanism for determining whether the trace returns to a position sufficiently close to its starting point after the left, down, right, and up sequence. A one signal in f–f 290 enables the operation of two counters; 311 is enabled directly, and 312 is enabled by way of gate 325. Counter 311 counts either up or down, continuously registering unit X increments or decrements as supplied by subtractor 331. Counter 312 registers similar information for Y changes.

The X counter is initially set to read −5, since f–f 290 is set to one only when $X_{i-5} - X_i \geqq 3$, i.e., the trace has already moved between three and five spaces to the left of the starting point. This implies that approximately a zero count would have been present at the beginning of the retrograde stroke, i.e., at the tip of the trace. This value is exactly zero for a horizontal or nearly horizontal line. Counter 311 subsequently changes count upon each detected difference between the instant $X_i$ sample and the last ($X_{i-1}$) sample (produced in delay element 330 and subtractor 331).

A similar initial setting is made for the Y counter 312. The information giving the vertical location of the trace five intervals preceding the instant interval is derived from a delay line, including serially connected delay elements 313, 314, 315, 316, and 317. The delay line produces signals that, at the time f–f 290 is set from zero to one, represent the present and five previous Y addresses. By using subtractors 318, 319, 320, 321, and 322 between adjacent taps of the delay line, five difference signals are produced which may be zero, +1 or −1 depending on whether the trace has not moved vertically or has gone up, or down, respectively. Four of these five differences, from subtractors 319 through 322, i.e., all but the most recent difference, are summed in adder 323. This sum is transiently gated into Y counter 312 as a starting count, through gate 324 as f–f 290 goes from the zero to the one state. This condition obtains by generating a signal in f–f 290 as it changes state from zero to one and by using the signal so developed to supply the enabling condition for gate 324. The $Y_i - Y_{i-1}$ difference from subtractor 318 provides the dynamic input to counter 312 via a separate gate 325 that is energized at this time by the one signal from f–f 290 and remains energized so long as f–f 290 remains in the one state. Thus, the starting count in the Y counter 312 indicates the total Y excursion since the beginning of the trace, and the ensuing counts correspond to the further Y excursions. It is thus apparent that if both the X counter 311 or the Y counter 312 subsequently read zero simultaneously the trace has returned to its starting location and a closure has occurred.

Figure 19:
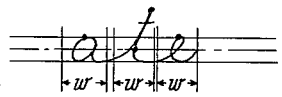
FIG. 19 is a drawing helpful in explaining the apparatus of FIG. 18.

On the assumption that closure is not always perfect, since an offset in either X or Y may occur, provision is made for a slight error in the final or closest return position of the trace. Accordingly, quantizer 326 is connected in the output of X counter 311 and quantizer 327 is connected in the output of Y counter 312. Each quantizer emits a signal if the corresponding count lies within three levels of zero, where zero denotes a perfect return. Consequently, if both the X and Y conditions are satisfied, and if f–f 304 is set to one indicating that a counterclockwise sequence of trace directions has occurred, multiple AND gate 328 is energized and a one is written into row eighteen via Write gate 118, signifying closure. In FIG. 19, closure is indicated for the *a* by the one written in row eighteen, whereas the imperfect return in the letter *o* is not so indicated. After a one unit delay, provided by delay elements 329, the flip-flops 290, 298, 301, and 304 are reset to zero through OR gates 305, 306, 307, and 308, respectively, and X counter 311 is reset to −5. The circuit has thus been restored to its initial conditions and is ready for the next closure detection.

*Termination of Mode I Operation*

The operations outlined above continue until writing is completed, at which time the selected letter feature information is recorded in register 35 (FIG. 3) in the appropriate columns denoting the X positions at which the features were detected in the script sample. A Stop-Write signal is generated preferably as the stylus reaches the last quantized position on the writing surface, e.g., position 255. Alternatively, the Stop-Write signal may be any overt signal that is sufficient to reset Write-Read flip-flop 1001 to zero (in the mode control apparatus diagram of FIG. 10). This is accomplished via OR gate 1028. Mode I operation is now terminated.

*Control of Mode II*

The operations of Mode II are initiated and controlled by the mode control apparatus shown in FIG. 10. A signal generated in f–f 1001 at the transition from its one condition to its zero condition sets Request-Recognition flip-flop 1002 to one. The consequent Request-Recognition signal emitted by f–f 1002 clears all counters and flip-flops in the apparatus used for Mode II operations to the initial condition specified for them. Also, in the mode control circuit, counters 1006 and 1016 are set to zero, as is f–f 1018. This is accomplished via OR gates 1007, 1015, and 1022.

The Request-Recognition signal, delayed for one interval by delay unit 1013 to allow completion of the above described clearing operations, set flip-flops 1010 and 1014 to the one state. Further, it acts through OR gate 1027 to set f–f 1002 to zero. The Request-Recognition signal is thus self-terminating, lasting only for one delay interval.

The setting of f–f 1001 to the zero or "Read" state (at the termination of Mode I) results in the transfer of control of the distributor (the matrix column control) from the input script to counter 1006. This is accomplished via delay elements 1003 and 1011 which disable gate 1004 and enable gate 1012, having allowed sufficient time for completion of the events initiated by the one state of the Request-Recognition flip-flop (1002).

*Mode II.—Segmentation of Words Into Letters*

Automatic reading of handwriting involves, in addition to the extraction of local features which lead to automatic recognition of isolated letters, the segmentation of continuous cursive script into discrete domains, each containing a single letter. It is obvious from a casual examination of a script sample that it is considerably more difficult to derive rules for letter separation than it is to describe tests for identification of an already separate letter. Further, it is obvious that a complete set of recognition rules must depend heavily on prior or concurrent segmentation of the script. Fortunately some segmentation and recognition rules may be identical. Moreover, some segmentation information is gratuitous since the left boundary of the initial letter of a word and the right boundary of the terminal letter are usually clearly defined. Further, some writers produce disjointed script, often having several gaps per word, such that the word is partially segmented as written.

Consider now an example of the general problem of segmentation. Given the script sample illustrated in line A of FIG. 21, it is necessary to establish twenty-nine separations of which twenty-six are internal to the four words. Ideally, a "slicing" procedure is preferred that results in the letter separation shown in line B of the figure.

Three classes of tests previously established viz; vertical extensions, retrograde motions, special marks, are used to advantage for segmentation in accordance with the present invention. Each of these properties not only defines the location of a letter, but by implication may also be used to indicate letter domains. For example, a lateral mark made at the center of each vertically extended, retrograde stroke, or special mark segment, as shown in line C of FIG. 21, locates twenty-two of the thirty letters in a rudimentary fashion. By establishing a measure of the average letter width $w$, however, two marks may be placed at $$\pm \frac{w}{2}$$

with respect to the locating marks to indicate the letter domains. Such an average-width measure is obtained, for example, by a simple computation derived from a count of zero axis crossings and a measure of the lateral span of a typical word. This process takes advantage of the fact that there are on the average about three axis crossings per letter, where the axis is a horizontal line at approximately the center line of small letters, e.g., the letters written between the central guide lines in FIG. 1. As an example, in the word unequivocal as illustrated in line D of FIG. 21, there are thirty-two axis crossings. Using an average of three axis crossings per letter, it follows that there should be $$\frac{32}{3}$$

letters, that is, approximately eleven letters in the word. Indeed, this is the case. If the width of the entire word is measured by counting the number of quantized spaces spanned and then divided by the estimated number of letters, then the average width $w$ of each letter is determined. The average width of each letter is thus measured in X quanta.

Figure 21:
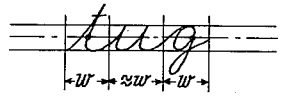
FIG. 21 is a drawing illustrating the manner by which connected cursive script is separated into discrete alphabetic letters in accordance with the present invention.

If a second mark is then placed at a distance of $$\frac{w}{2}$$

on both sides of each locating mark, the word is divided as shown in line E. It will be noted that twenty-two letter domains are assigned directly and six more are obtained gratuitously since they comprise single letters sandwiched between the boundaries of two identified domains. Only the *un* of *unequivocal* is not separated. However, if the space occupied by this group is treated in the fashion described below, the segmentation operation is completed. It has been found that this procedure provides correct segmentation better than ninety percent of the time. Consequently, the letters in words such as *ate*, illustrated in line F of FIG. 21, are fully segmented. In this example a retrograde mark found in the letter *a* permits a segmentation mark to be placed $$\frac{w}{2}$$

spaces to the left and a similar mark to be placed $$\frac{w}{2}$$

spaces to the right of the central mark. In the letter *t* a slope adjusted Y extremal provides a center for the $$\pm \frac{w}{2}$$

marks; and a retrograde stroke in the letter *e* permits segmentation marks to be placed about the *e*.

Although the landmarks employed for segmentation, viz; retrogrades, vertical extensions, dots, and the like, occur for only twenty of the twenty-six alphabetic letters, most of the other characters (*m, n, r, u, v, w*) are statistically scattered such that they are frequently sandwiched between established domains and hence themselves are segmented. Consider, for example, the word *tug* in FIG. 21G in which the letter *u* is devoid of landmarks. However, since both the *t* preceding it and the *g* (slope adjusted negative Y extremal) following it are properly segmented, the *u* is also. If two non-landmark letters are included between landmark letters, as in the word *gums* shown in FIG. 21H, they can be separated by examining the interval between the right-hand segmentation mark of *g* and the left-hand segmentation mark of *s*. By inspecting such intervals for approximately integral multiples of estimated letter width $w$ the presence of two or more letters between previously established segmentation marks may be detected and the included space subdivided into the appropriate number of equal intervals. The three non-landmark letters *unn* in *gunner* (FIG. 21I) are also segmented by this process by subdividing the space between properly segmented letters *g* and *e* into three equal parts. In general, if these non-landmark letters occur in trigrams or greater combinations, the accuracy of segmentation of the central letter (or letters) tends to fall off. However, trigram frequencies of the six letters (*m, n, t, u, v, w*) occur less than one-half percent of the time. There is even a smaller incidence of combinations of four or more of these letters, e.g., as in *running*.

Details of Segmentation Operations

As discussed above in connection with FIG. 3, the segmentation operations of Mode II may conveniently be broken down into five separate operations.

(1) Mode IIA—Letter Width Estimate

CONTROL OF MODE IIA

The Width Estimate operation begins by sweeping the distributor forward ($X_i=0, 1, 2 \ldots$) while examining the continuity of the $X_i$ marks that previously were recorded in row twenty-three of the storage matrix. A one was entered in row twenty-three at every $X_i$ location occupied by the script trace. The flow of ones is considered continuous until at least five consecutive zeros are encountered. A threshold of five is selected to be larger than any normally encountered gap within a word but smaller than average interword spacings. A sequence of ones is thus defined as continuous if it contains gaps of not more than four consecutive zeros in it; further, it must be both preceded and succeeded by five or more consecutive zeros. Such a sequence is then classified as representative of a single word.

Figure 22:
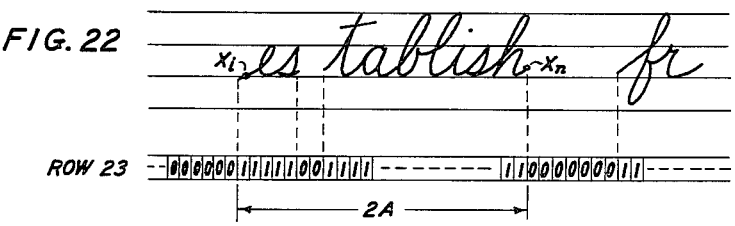
FIG. 22 is a drawing that illustrates the manner in which a letter width estimate is made in accordance with the present invention.

FIG. 22 illustrates these conditions. A sample of script is shown, below which is the continuity register (row twenty-three). In this row of the matrix, successions of ones and zeros are recorded in dependence on the continuity of the writing. The gap occurring between the letters *s* and *t* results in two consecutive zeros being recorded in the row. Since this is below the threshold established above, the gap is considered to be only an intraword gap. However, the gap between *h* and *f* includes seven consecutive zeros bounded by sequences of ones. This interval is recognized as a gap between words, and the interval between $X_i$ and $X_n$ (denoted as 2A) is classified as a word. The script samples and the quantizing indicated by the spacings of row twenty-three are not drawn to the same scale. Actually there are on the order of ten quantized spaces over the width of a typical letter.

LETTER WIDTH ESTIMATION

The number of individual letters in a word is obtained by taking a count of the center-line axis crossings of the trace in the interval between $X_i$ and $X_n$. This count may be denoted 3B. Assuming that the number of letters in a word is approximately equal to one-third of the total number of center-line axis crossings, i.e., $$\frac{3B}{3}$$

the quotient of word length divided by one-third the number of center-axis crossings, $$\frac{2A}{B}$$

is a close approximation to the average width of a letter in the word. The quantity of interest is the half letter width $$\frac{w}{2}$$

which is just $$\frac{A}{B}$$

For the quantization scale chosen, by way of example in FIG. 4, a typical half letter width is approximately four to seven units.

Figure 23:
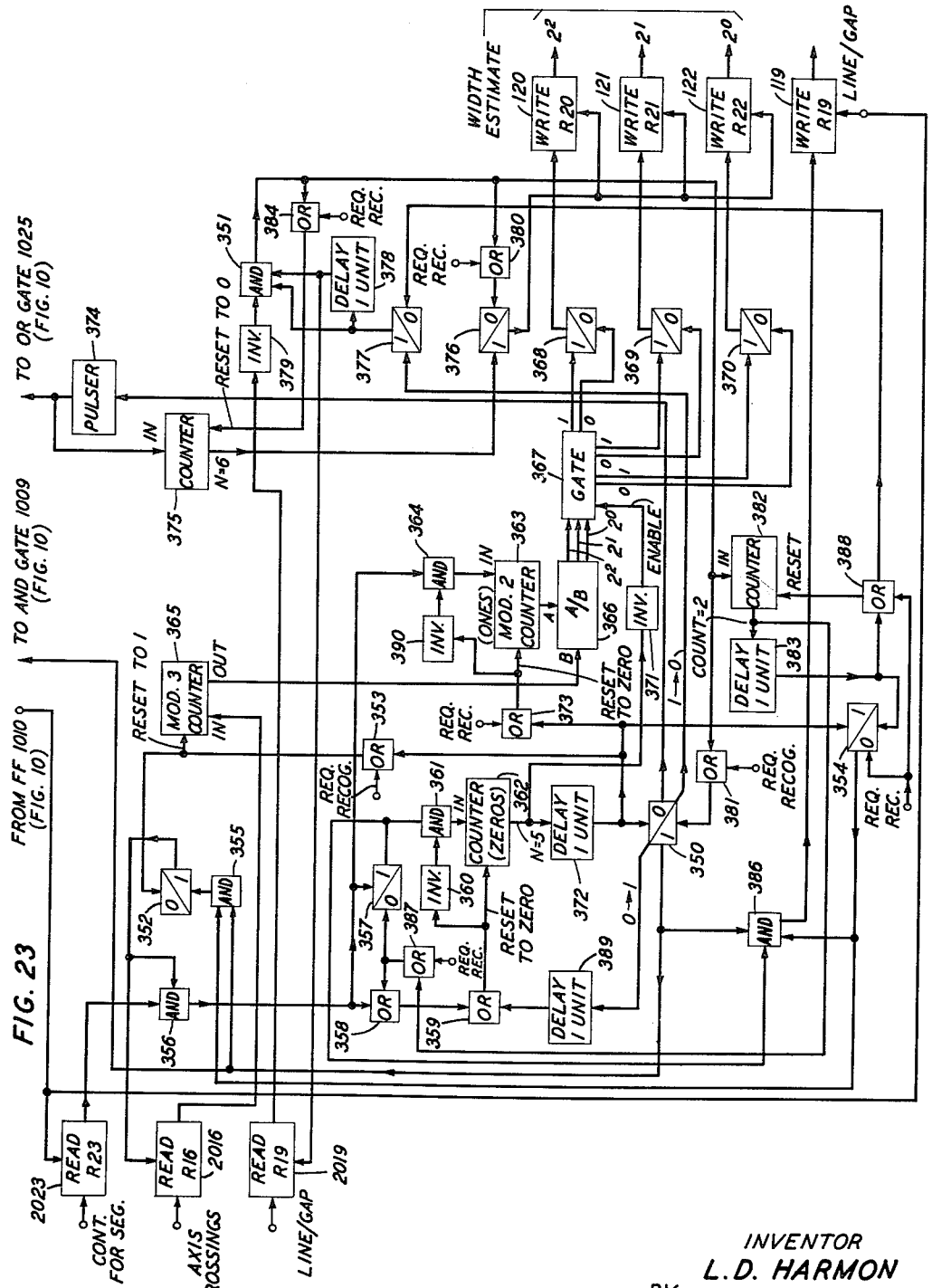
FIG. 23 is a block schematic diagram of apparatus for providing a width estimate of the individual letters in connected cursive writing.

FIG. 23 illustrates apparatus for obtaining a suitable letter width estimate. As flip-flop 1010 in the mode control apparatus of FIG. 10 is set to one at the onset of Mode II operation, one of the two AND conditions at gate 1009 feeding the pulser 1008 (FIG. 10) is established. The second condition is derived from *f–f* 350 (FIG. 23) which is set to one (through OR gate 381) by the Recognition-Request signal (*f–f* 1002, FIG. 10). The one signal from *f–f* 350 provides the other enabling condition for AND gate 1009 which then energizes pulser 1008. As a consequence, pulser 1008 begins to emit pulses that drive counter 1006 forward (via OR gate 1024) by unit steps from zero toward 255. The function of counter 1006 is to register the net number of "increase count" pulses which arrive via OR gate 1024 and "decrease count" pulses which arrive via OR gate 1025. The instantaneous count in 1006 is transmitted to the distributor via gates 1012 and 1005, thus controlling the column of the matrix energized at that moment. Consequently, by applying suitable sequences of pulses to the two inputs of counter 1006, the columns of the matrix may be addressed in any desired order. Since AND gate 1012 is enabled as pulser 1008 begins to increment from zero the count in 1006, the distributor begins advancing from $X_i=0$ onward.

The one signal from *f–f* 1002 (Request-Recognition), insures that *f–f* 352 is set to zero by way of OR gate 353. Additionally, the Request-Recognition signal *f–f* 354 to zero. Hence, one of the two AND conditions is present to enable AND gate 355. The other AND condition is provided one unit of delay after *f–f* 1002 is set to its one state, by the one signal developed in *f–f* 350. This delayed signal is the same one that is responsible for enabling pulser 1008, described above. Thus *f–f* 352 is set to its one condition at the same time that the distributor advance begins. The one signal from *f–f* 352 enables Read gate 2016 which emits a one signal each time an axis-crossing ($Y_i=16$) record in the register (matrix) is encountered. These signals are used to compute a letter count estimate.

The one signal from *f–f* 1010 (control, FIG. 10) simultaneously energizes Read gate 2023 which reads out a one signal at every $X_i$ location in the register at which the script trace was present. As ones are read out of row twenty-three of the register, they pass through AND gate 356, (which is enabled by the one signal from *f–f* 352), into counting circuits that detect word spaces but, however, ignore sequences of zeros of four or less.

As an example, if a sequence of zeros is read out of row twenty-three at the start of these operations, *f–f* 357, that previously had been set to zero by the one signal from *f–f* 1002, is not affected. The zeros passing through OR gates 358 and 359 cannot pass by way of inverter 360 and AND gate 361 to advance counter 362 since AND gate 361 is not enabled by *f–f* 357. Furthermore, the zeros do not advance counter 363 since they cannot enable AND gate 364. Since all $X_i$ signals are zeros, no one signals are read out of Read gate 2016, and thus none are applied to counter 365. Counter 365 previously was cleared to a starting count of one, in a manner to be described more fully hereinafter, by the Recognition-Request signal.

As the distributor reaches and passes the $X_i$ point in the register at which a line trace indication begins, one signals are read out of Read gate 2023. Counter 362 will immediately be reset to zero, if it is not already cleared, by a signal passed through AND gate 356 and OR gates 358, and 359. Counter 362, the zero counter, indicates the number of consecutive zeros supplied to it from row twenty-three but is reset to zero by each one that is encountered. It is required, however, that the sequence of zeros preceding initial trace, i.e., the blank space preceding writing, not affect counter 362. Consequently, *f–f* 357 is not set to one; thus AND gate 361 and counter 362 are not activated until the first one is read out of Read gate 2023.

As one signals are read out of row twenty-three, they are registered in counter 363, via AND gate 364. Counter 363, reset to zero by the Request-Recognition signal and inhibited so long as a reset signal was present, accepts the count. It counts Modulo 2 that is, it counts applied signals by twos and, when loaded by a complete word, has a count of $$\frac{X_n - X_1}{2}$$

in preparation for half letter width estimate. Its output is the quantity A which is applied to the A/B divider 366.

As center-line axis crossings registered in matrix row sixteen are encountered, one signals are read out of the row and are counted Modulo 3, that is, by threes, in counter 365. This provides the required quantity B which is fed directly to the B input of the A/B divider 366. Counter 365 initially was reset to a count of one; a zero count is not allowed in order to avoid division by zero in divider 366. Such an operation generally introduces difficulties in typical divider apparatus. The A/B quotient is continuously formed and supplied to a multiple channel gate 367. This gate is enabled at this time, since counter 362 is producing no active output; the inversion (371) of that null signal provides the enabling condition for gate 367. Thus A/B, a three bit number, is continuously supplied to flip-flops 368, 369, and 370, which actively register this quotient for any instantaneous count in counters 363 and 365. This is the width estimate information $$\frac{w}{2}$$

that is to be written into the storage matrix when the end of the word is encountered.

As one signals are read out of Continuity gate 2023, some gaps due to noise or intraword spaces may be encountered. So long as they are small, i.e., less than five zeros in length, counter 362 does not emit a full count signal, ($N=5$), and is reset with the subsequent one signal supplied to it. However, if five zero signals are encountered, a word end is presumed to have occurred, and counter 362 with a full count of five produces an output signal. The output signal is employed to disable gate 367 through inverter 371. Consequently the present quotient is held in the three flip-flop circuits 368, 369, and 370. This sample-and-hold operation preserves the quotient until it is stored, and gate 367 is subseqeuntly reopened. After a unit delay provided by element 372 (allowing completion of the above operation), counter 363 is cleared to zero through OR gate 373 and counter 365 is cleared to one through OR gate 353. Additionally, flip-flops 354 and 352 are reset to zero. With 354 in the zero state, further counting by counters 362, 363, and 365 is inhibited since they are deprived of input information.

From the first one encountered in row twenty-three, representing the start of the word being processed, all three conditions required by AND gate 385 are present. Consequently ones are written into row nineteen via Write gate 119. This operation has the function of filling in any minor gaps which may be present within a word (as reported by row twenty-three); row nineteen, when this process is completed, will have gaps (zeros) only between words.

Counter 362 continues to hold a count of five. The delayed output signal, indicating this count, sets flip-flop 350 to zero. This has several effects. First, AND gate 386 is disabled. Consequently Write gate 119 is inhibited, and no more ones are written into row nineteen. Another result of the zero state of f–f 350 is that pulser 1008 (FIG. 10) is inhibited (via AND gate 1009) from advancing counter 1006. Since a unit delay (372) corresponds to a pulse period in a pulser, the distributor is advanced one position ($X_i$ column) past the location of the fifth consecutive zero which put a full count in counter 362. It is now required that the distributor be stepped backwards to the last one location (six spaces to the left of the present location). The zero signal from f–f 350 initiates action in pulser 374 whose output subtracts counts from counter 1006 thus bringing the distributor back in the $-X$ direction until counter 375 reaches a count of six. This condition indicates that the distributor has reached the $X_i$ location at which the last one in the word had been written. A count of six in counter 375 sets f–f 376 to its one condition, that in turn supplies the enabling signal for the Write gates 120, 121, and 122. Accordingly, the half width letter estimate $$\frac{w}{2}$$

is written by these gates into the appropriate rows of the register matrix.

The transition of f–f 350 from its one to its zero condition sets f–f 377 to one which, following a unit delay (378), enables Read gate 2019. This gate now reads out ones so long as the distributor is backed up, and the width estimate information continues to be written via Write gates 120, 121, and 122 for the entire length of word in which the estimate applies. This condition persists until the next (earlier) gap in row nineteen is encountered. As a previously recorded gap in row nineteen is read out, the zero signal is inverted in inverter 379 to set f–f 376 to zero through AND gate 351 and OR gate 380, thus stopping the writing of width estimate information by Write gates 120, 121, and 122. Also, this gap in row nineteen installs the first count in counter 382. It also sets f–f 350 to one through OR gate 381, that in turn inhibits pulser 374, and stops the distributor from its regression.

The transition signal developed as f–f 350 is set from its zero to its one state resets counter 362 to zero after a unit delay (389). F–f 352 has not been reset to one, however, so that counters 362, 363, and 365 remain disabled. Since f–f 350 is now in its one state, pulser 1008 commences to advance the distributor in the forward direction, running through the $X_i$ locations of the word which is being operated upon.

The distributor advance continues until the gap to the right of the word is read out of row nineteen. It is inverted as before, and its only result now is to insert another count in counter 382 for a total of two. The output signal thus emitted from the counter sets f–f 357 to zero via OR gate 387, thus setting up its initial state for the subsequent width estimates. The delayed (383) output signal from counter 382 sets f–f 354 to zero. Also, via OR gate 388, this signal sets f–f 377 to zero and resets counter 382 to zero. With f–f 377 in the zero state, AND gate 351 is inhibited and the transmission of row nineteen information is halted. With f–f 354 set to zero, AND gate 355 is enabled, and f–f 353 is set to one. This restores all elements to their initial conditions, ready for another width estimate cycle. Consequently the several counters begin operation on the next registered word information.

If there is no next word, but only gaps are encountered, f–f 357 will not be set to one again, and no action occurs until $X_i = 255$ is reached. This, reflected as a full count in counter 1006 (FIG. 10), resets f–f 1010 to zero. Consequently pulser 1008 is inhibited, and width estimate operation is terminated. Further, the full count in 1006 resets that counter to zero through OR gate 1007; thus counter 1006 and the distributor now reside once again at $X_i = 0$.

(2) *Mode IIB—Y Extremal Segmentation*

CONTROL OF MODE IIB

Considering again the mode control apparatus of FIG. 10 a full count of two hundred fifty-five in counter 1006, terminating Mode IIA as previously described places a count of one in counter 1016 and sets f–f 1018 to one via AND gate 1017. The signal passed by 1017 also sets flip-flops 401 and 402 (FIG. 25) to one via OR gates 423, 424, and 421. A count of one in counter 1016 sets f–f 450 in FIG. 26 to one; that, as a consequence, enables Read gates 2004 and 2006 (±Y_max, slope adjusted). At the same time, the one signal from f–f 401 in conjunction with the one signal from f–f 1018, acting through AND gate 403 and OR gate 404, activates pulser 405. Since f–f 402 is set to one, AND gate 406 passes a signal to OR gate 1024, and counter 1006 (FIG. 10) begins to advance, driving the distributor ($X_i = 0,1,2 \ldots$).

Y EXTREMAL SEGMENTATION

Figure 24:
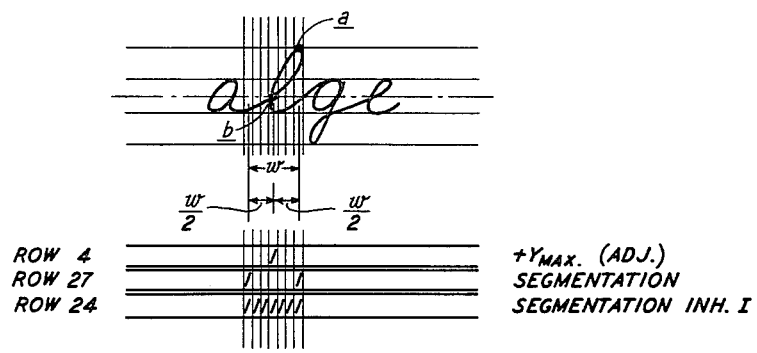
FIG. 24 is a drawing helpful in explaining the apparatus of FIG. 23.

FIG. 24 illustrates the required sequence of operations. The connected cursive letters *alge* are shown with the relevant matrix rows indicated below on a greatly enlarged scale. The one signal registered in row four at the $+Y_{max}$ slope-adjusted location indicates the approximate center of the interval defining the letter width $w$. The distributor is stopped when this mark is detected, and subsequently the distributor is reversed and its associated counting elements begin to count in the reverse direction until $$\frac{w}{2}$$

spaces have been passed. At this point a mark is made in row twenty-seven of the matrix. This is the leftmost one of the two segmentation marks that are required. The distributor is then stopped, reversed, and counting proceeds in the normal X direction for $w$ spaces and a second mark is inserted in row twenty-seven of the matrix defining the rightmost limit of the letter width interval.

During the time that the distributor is counting in the forward direction from the leftmost segmentation mark entered in row twenty-seven, one signals are entered continuously in row twenty-four until the rightmost segmentation mark has been entered in row twenty-seven. This sequence of ones indicates that the segmentation process for the particular letter under consideration, *l*, is complete and that subsequent operations need not be performed to aid in the segmentation of this alphabet letter.

Considering now the apparatus shown in FIGS. 25 and 26, as pulser 405 proceeds to emit pulses, counter 407 begins to count Modulo 2. Counter 407 can count either by twos, or conventionally, by ones, so long as f–f 402 is in the one state, counter 407 counts by twos. The output signal ($N_1$) representing the count accumulated by 407 is applied to comparator 408. Comparator 408 is disabled during this epoch, so long as a zero signal is applied to it from f–f 401 through unit delay element 409.

The distributor advance proceeds until a Y extremal, either plus, or minus, is encountered either via Read gate 2004 or 2006. At this time, gate 410 is energized, inasmuch as f–f 411 is in its zero state. Thus, counter 407 is cleared to zero after a unit delay 412 through OR gate 413, and is prepared to count for a segmentation operation on the plus or minus $Y_{max}$ mark. The $±Y_{max}$ signal also sets f–f 414 to its one state; that in turn energizes Read gates 2020, 2021, and 2022 and supplies the half letter width estimate $$\frac{w}{2}$$

as a signal $N_2$ via a sample-and-hold circuit (432) to the second input of comparator 408. The comparator however is still in a disabled state. The $±Y_{max}$ signal also resets f–f 401 to its zero state (via OR gate 429) thus stopping the distributor advance by disabling pulser 405. Then, after a unit delay (409), comparator 408 is enabled, and produces an output signal if and when $N_1 = N_2 \neq 0$. As f–f 414 is set from zero to one, f–f 402 is set to zero, thus energizing AND gate 415 and permitting the distributor to go backwards if and when pulser 405 is subsequently restarted to supply the other enabling condition of AND gate 415.

A further consequence of f–f 414 becoming set from zero to one occurs one delay interval (416) later; f–f 417 is set to its one condition through OR gate 418. This has two results: first, Write gates 124, 125, and 126 are potentially enabled through AND gates 451, 452, and 453 (FIG. 22). However, gate 451 is the only one of the three whose other AND condition is satisfied since counter 1016 contains a count of one and supplies a one signal to AND gate 451 (and not to gates 452, 453). Consequently, a one is written in row twenty-four via Write gate 124. The X location of this mark is that at which the distributor was stopped, i.e., at a detected $±Y_{max}$ signal. The second result of f–f 417 being set to one is that pulser 405 is restarted through OR gate 404 and begins driving the distributor backwards, since f–f 402 is in its zero state so that AND gate 415 (rather than AND gate 406) is energized. The distributor is backed up until $N_1 = N_2$.

Since f–f 402 is in the zero state, counter 407 counts Modulo 1; consequently when $N_1 = N_2$ the distributor has reached a location one-half the average letter width to the left of the $Y_{max}$ extremal. This is the desired location for making a segmentation mark. During this activity, one signals have been written continuously into row twenty-four via Write gate 124 at each quantized location from the Y extremal to the instant location.

An output signal is produced in comparator 408 when $N_1$ is equal to $N_2$, setting f–f 417 to zero through OR gate 419. Removal of the f–f 417 one signal from OR gate 404 removes the energization from pulser 405; hence, counter 407 and the distributor are both stopped. Write gate 124 is also inhibited since one of the necessary enabling conditions is removed from AND gate 451. Further, the $N_1 = N_2$ signal from comparator 408 energizes segmentation Write gate 127 so that a one is written in row twenty-seven at this location. This is a segmentation mark, made at a location $$\frac{w}{2}$$

spaces to the left of the Y extremal.

Following the generation of a signal in comparator 408 signifying that $N_1 = N_2 \neq 0$, f–f 414 is set to zero after a unit delay (420) via OR gate 430, thus disabling Read gates 2020, 2021, and 2022. However, the quantity $N_2$ is retained in the sample-and-hold circuit 432 and thus in the comparator 408 until changed by a new half width letter estimate, $N_2$. Also the delayed $N_1 = N_2$ signal is utilized to set counter 407 to zero through OR gate 413. Additionally, f–f 402 is set to one by the signal from OR gate 421 preparatory to moving forward again. In going from the zero to the one condition, f–f 402, enables AND gate 422 so that a signal passed through OR gate 418 sets f–f 417 to the one condition. If a signal from OR gate 419 is simultaneously present to set f–f 417 to zero, it is inverted in inverter 428 to disable AND gate 422. Similarly, transient command signals from gate 1017, designed to set f–f 402 to one, are inverted in inverter 427 to disable AND gate 422 preventing f–f 417 from being set to one. Such transient inhibitions are not present at this stage of the operations. Accordingly, Write gate 124 is again energized by the one signal from f–f 417 acting through AND gate 451. Simultaneously pulser 405 is restarted and the distributor begins advancing once again.

The same condition that set f–f 414 to the zero state also sets f–f 401 to one through OR gate 423. Thus there is a redundant command through AND gates 403 and 404 for the pulser 405 to begin operation. Also f–f 401, in going from the zero to the one condition, supplies a pulse via OR gates 424 and 421 sufficient to set f–f 402 to its one condition; this signal also is redundant. The one state of f–f 401 disables comparator 408, by removing the enabling signal, following a unit delay in element 409. Further, the one signals from f–f 401 and f–f 417 simultaneously present at AND gate 425 set f–f 411 to one, inhibiting further $±Y_{max}$ signals from passing through gate 459.

The distributor advance continues until the original $\pm Y_{max}$ location is encountered; meanwhile counter 407 continues counting Modulo 2. Thus the spaces comprising $$\frac{w}{2}$$

that have just been passed (from the leftmost segmentation mark to the Y extremal location) i.e., the present location are counted by two, i.e., are tallied as $$\frac{w}{4}$$

Hence, counter 407 will register a half letter width count only if it produces a further count of $$\frac{w}{4}$$

i.e., the pulser delivers additonal pulses that drive the distributor one-half letter width distance $$\left(\frac{w}{2}\right)$$

to the right from the instant Y extremal location.

As the Y extremal signal is read out of either row four or six in passing, it sets $f-f$ 401 to zero. This action has no effect on pulser 405 since it is being energized by the one signal from $f-f$ 417 through OR gate 404 at this time. However, one delay period after $f-f$ 401 is reset to zero, comparator 408 is enabled through delay element 409. Signal $N_2$, representing one-half a letter width, still resides in the sampler and comparator, and $N_1$ is increased as counter 407 builds up its count Modulo 2. When 407 has a full count, that is, a count equal to $$\frac{w}{2}$$

$N_1 = N_2 \neq 0$ once again obtains and a similar, although not identical, set of terminating events occurs as described above.

First $f-f$ 417 is set to zero through OR gate 419, inhibiting pulser 405 so that both counter 407 and the distributor are quiescent. Write gate 124 is also disabled, leaving a sequence of ones in row twenty-four indicating the full length of the segmentation span. Additionally, the signal from comparator 408 energizes Write gate 127 so that the required segmentation mark, the second one of the pair, is written in row twenty-seven at a location $$\frac{w}{2}$$

spaces to the right of the Y extremal mark. After a unit delay interval (429), counter 407 is reset to zero terminating the $N_1 = N_2$ signal. Additionally, $f-f$ 401 is set to one; this in conjunction with the one signal from $f-f$ 1018 (FIG. 10) enables AND gate 403 so that pulser 405, counter 407, and the distributor are once again energized. The comparator 408 is also disabled again inasmuch as $f-f$ 401, having been set to the one condition, fails to provide an enabling signal through delay element 409. The transition from one to zero by $f-f$ 417 is sufficient to reset $f-f$ 411 to its zero condition through OR gate 426. The zero signal emitted by $f-f$ 411 once again enables AND gate 410, establishing a path for all succeeding $\pm Y_{max}$ indications. The initial conditions have thus been re-established with the distributor advancing in the forward direction ready to repeat the cycle for the next encountered Y extremal registered in the matrix.

If no additional Y extremal signals are encountered, the distributor continues to advance until $X_i = 255$, at which time counter 1006 (FIG. 10) again has accumulated a full count. This in turn installs a count of two in counter 1016, and via the output signal 2 from the counter, resets $f-f$ 450 (FIG. 26) to zero and sets $f-f$ 454 to one. Since flip-flops 1018, 401, and 402 are each in the one state, the distributor continues to advance from $X_i = 0$ forward through the matrix once more.

(2) *Mode IIC—Retrograde Motion Segmentation*

CONTROL OF MODE IIC

At this point Mode IIC operation is initiated. All starting conditions are the same as those at the beginning of mode IIB except that $f-f$ 450 is set to zero and $f-f$ 454 is set to one instead.

RETROGRADE MOTION SEGMENTATION

The purpose of this portion of the segmentation operation is to establish segmentation marks at $$\pm\frac{w}{2}$$

with respect to all previously registered retrograde landmarks. It is required that these new marks not be made at or near marks already made. For example, in the letters $d$ or $p$ there are retrograde strokes as well as Y extrema. Having segmented on the basis of one feature it is neither necessary nor desirable to utilize the other. Consequently, the information stored in row twenty-four, indicating that the corresponding intervals have previously been fully segmented, is utilized to inhibit further segmentation operations for those intervals. Row twenty-four registers one signals for the entire span of segmentation marks derived from the previous Y extremal operation of mode IIB.

The count of two registered in counter 1016 provides one of the two conditions required for energizing AND gate 452, thus to permit Write gate 125 to become enabled. As $f-f$ 417 is subsequently set to one, indicating that a new segmentation mark is called for, the other enabling condition for gate 452 is provided, and a sequence of ones will be written into row twenty-five. These marks signify that segmentation has been completed for the second class of tests; they subsequently are used to inhibit further attempts to segment these spaces. This is analogous to the preceding operation involving the segmentation inhibition signals registered in row twenty-four.

The one signal produced by $f-f$ 454 is passed through OR gate 455 to enable Read gate 2024. Consequently, segmentation inhibition I marks are read out of row twenty-four whenever they are encountered. In the absence of such ones, the inverted (via inverter 456) output of Read gate 2024 passes through OR gate 470 to enable AND gate 457. This, with the one signal from $f-f$ 454 enables Read gate 2010. Consequently, if a retrograde signal is detected in row ten as the distributor advances, it is read out of gate 2010 via OR gate 458 and passed through OR gates 459 and 460 to enable AND gate 410. The subsequent events for writing segmentation marks $$\pm\frac{w}{2}$$

spaces on both sides of the retrograde landmark are identical to those described above for Y extremal segmentation.

If, however, as the distributor advances, a section is encountered for which a Y extremal segmentation mark has previously been made, the sequence of inhibition I signals emerging from Read gate 2024 disables Read gate 2010 by disabling AND gate 457. No retrograde marks may then be employed for segmentation over this span. Consequently, the distributor continues to advance the matrix inspection until another uninhibited retrograde mark is encountered. At $X_i = 255$ mode IIC is terminated, as before, and counter 1016 is advanced to three.

(3) *Mode IID—Slash Mark Segmentation*

CONTROL OF MODE IID

A count of three emerging from counter 1016 sets $f-f$ 461 to the one condition, resets $f-f$ 454 to the zero condition and provides the other enabling condition for AND gate 453.

SLASH MARK SEGMENTATION

In this mode of operation, the landmarks for segmentation comprise slash marks which are stored in row nine of the register. Both segmentation inhibition I and II are simultaneously active in this mode to prohibit segmentation where it has previously occurred. Accordingly, both Read gates 2024 and 2025 are energized by the one signal of f–f 461 acting through OR gates 468 and 455. Inhibition signals I and II, acting through inverters 456 and 462 and OR gates 470 and 471, respectively, operate in the absence of preregistered segmentation marks to enable AND gate 463, permitting Read gate 2009 to examine row nine of the matrix. Detected slash marks previously registered are read out and supplied by way of OR gates 454, 458, 459, and 460 to enable gate 410. Segmentation follows for this eventuality as described above. Inasmuch as AND gate 453 is enabled, new inhibition information, termed Inhibition III, is written into row twenty-six through Write gate 126 for inhibiting further segmentation operations. This sequence of operations continues until the distributor reaches a count of two hundred fifty-five, indicated by counter 1005. As before, a detected prior segmentation mark (inhibition I or II) locks out an additional attempt to segment.

*Mode IIE Dot—Dot Mark Segmentation*

CONTROL OF MODE IIE

Termination of the previously described mode of segmentation steps counter 1016 to a count of four. Accordingly, f–f 465 is set to the one condition and f–f 461 is reset to zero. The one signal from f–f 465 provides one of the two enabling signals for AND gate 466. So long as previously entered segmentation marks are not encountered in rows twenty-four, twenty-five, and twenty-six, Read gate 2007 is enabled and examines row seven of the matrix for previously registered dot information as the distributor steps along from $X_i=0$ toward $X_i=255$. An encountered dot in row seven is sufficient to energize AND gate 410 and initiate the sequence of segmentation operations previously described.

TERMINATION OF MODE II OPERATION

Completion of the segmentation operation leaves counter 1016 (referring again to mode control apparatus FIG. 10) with a count of five. This signal is sufficient to reset f–f 1014 to zero thereby disabling AND gate 1017; also f–f 465 is set to zero. The count of five from counter 1016 also sets f–f 1023 to the one condition. Finally, the five signal from counter 1016 acting through unit delay element 1021, and OR gate 1022 resets counter 1016 to zero and sets f–f 1018 to zero. All segmentation operations are thus disabled.

MODE III OPERATION

The one signal produced by f–f 1023 may be utilized to initiate Mode III operations employed ultimately to identify the individual letters of the script sample written in transducer 20 from features registered in the matrix 35. In order to match the feature groups which have been extracted from the script and stored in the matrix, it is required first that the stored segmentation marks be utilized. The matrix need only be scanned once more, serially from beginning to end, and segmentation marks evaluated. In this process, final letter domain information is established according to the following rules:

(1) A letter domain is defined as the interval between any two segmentation marks that span approximately $w$ spaces.

(2) If two adjacent segmentation marks span approximately $2w$ or $3w$ spaces, the distance spanned is equally divided into two or three equal spaces respectively by new segmentation marks. Thus several letter domains may be established between a pair of original segmentation marks.

(3) In some cases, the rightmost segmentation mark of one domain may lie slightly to the right of the leftmost mark of the next adjacent domain. Such overlapping is treated by ignoring the space between two adjacent segmentation marks that span considerably less than one estimated letter width $w$, e.g., ten percent of $w$.

The rules may be implemented by examining the stored groups of features that lie between each pair of segmentation marks and comparing them with a permanently stored list of features according to a truth table that establishes the requirements for single letter identification. As indicated above, Mode III operation may follow, in principle, any well known correlation technique for obtaining a best match between the results of a set of tests and a predetermined set of criteria, e.g., that described and illustrated in the truth table of FIG. 3.

Details of the operations required for an analysis of written connected cursive script have been described, that permit entire words to be segmented into discrete letters, and provide unique indicia required for the letter identification. Although the extraction of sufficient feature and segmentation data has been described for both of these functions, and apparatus suitable for carrying out the recommended operations has been described in detail, it is obvious that various other features and combinations of features may be employed, as well, to provide unique identification of an ensemble of patterns. Moreover, apparatus details will readily occur to those skilled in the art that will greatly enhance the extraction and utilization of the selected features; which modifications, however, are deemed to be well within the scope of the present invention.

What is claimed is:

1. Apparatus for automatically reading connected cursive script comprising means for generating signals proportional to the coordinates of position of a writing instrument as it is moved to produce written intelligence, means for detecting selected individual significant features characteristic of written intelligence in said signals, means for storing indicia representative of said features, means for preregistering indicia of characteristic features of discrete letters in a preselected alphabet, means for comparing said stored indicia with said preregistered indicia, and means operably responsive to said comparison for identifying said written intelligence.

2. Apparatus for identifying connected cursive symbols comprising in combination, transducer means for translating cursive symbols into electrical signal representations, means for extracting from said signal representations a plurality of indicia representative of significant features of written intelligence, means for registering said indicia in preestablished groups corresponding to individual letters of a selected alphabet, means for preregistering indicia if features of written intelligence in groups representing the individual letters of each one of said selected alphabet letters, means for individually comparing said registered groups of indicia with each one of said groups of preregistered indicia, and means operably responsive to said preregistered portions for identifying said discrete letters.

3. Apparatus for automatically reading cursive script comprising means for generating real time signals proportional to the coordinates of position of a writing instrument as it is moved to produce written intelligence, means for quantizing said signals in two coordinate directions, means for analyzing said quantized signals to detect individual significant features of written intelligence characterized by said quantized signals, means for generating and storing indicia of said detected features, means for storing indicia representative of features characteristic of each of the individual letters of a preselected alphabet, means for comparing said indicia of said detected features with said stored indicia of feature representations of each one of said alphabetic letters, and means responsive to matching indicia for producing an output signal indicative of the identity of said cursive script.

4. Apparatus for automatically reading cursive script comprising means for generating signals proportional to the coordinates of position of a writing instrument as it is moved by an operator over a writing surface, said writing surface being separated into visually distinctive regions extending longitudinally in said surface, said writing instrument producing Roman script letter formations in selected regions of said surface according to the natural formation of individual alphabetic letters, means for extracting from said signals selected individual significant features of Roman letters, said features being characterized by the time-ordered traversals in selected directions by said writing instrument on said surface, means for storing indicia of said features, means for preregistering discrete indicia of features representing the individual letters of a preselected alphabet, said preregistered indicia being characteristic of features of script letter formations, means for comparing said stored indicia with said preregistered indicia, and means operably responsive to said comparison for producing manifestations of the letter formations written on said surface.

5. Apparatus for automatically reading cursive script comprising means for generating real time signals proportional to the coordinates of position of a writing instrument as it is moved over a writing area divided in a direction normal to the direction of writing into three approximately equal portions to produce words composed of a connected sequence of Roman letters, said letters being written such that small letters such as $a$, $e$, and $o$ occupy primarily the center portion of the writing area, letters with top extensions such as $t$ and $h$ occupy primarily both the center and upper portions, and letters with bottom extensions such as $g$ and $y$ occupy primarily both the center and lower portions, means for quantizing said signals, means for analyzing said quantized signals to detect individual significant features of Roman alphabetic letters characterized by the portions of said writing area sequentially occupied by said letters, said significant features including (1) portions of said letters formed as said writing instrument is moved in a direction counter to the normal direction of writing, (2) sharp reversals of direction of said writing instrument and (3) special marks made by said stylus in separate discontinuous contacts with said writing area, means for storing indicia of said detected features, means for storing indicia of corresponding features representing each of the individual letters of a preselected alphabet, means for comparing indicia of said detected features with indicia of said stored feature representations of each one of said alphabetic letters, and means responsive to matching indicia for producing output signals indicative of the identity of said cursive script.

6. Apparatus for registering distinctive features characteristic of the individual letters in a script formation of connected cursive alphabetic letters comprising means for generating signals proportional to the coordinates of position of a writing instrument as it is moved by an operator to produce a sequence of connected cursive alphabet letters, means for quantizing said signals, means for extracting individual significant features of alphabetic letters from said quantized signals, said means for extracting significant features including means for examining said quantized signals to detect (1) signals representing vertical extensions in successive portions of said script formation, (2) signals representing the presence of dot marks, cross marks and slash marks in said formation, (3) signals representing the presence of retrograde segments of said formation, (4) signals representing the presence of cusps in said formation, and (5) signals representing closures in said formations, and means for registering the signals representing detected significant features.

7. In apparatus for identifying the individual letters in a script formation of connected cursive letters, means for extracting significant features of written intelligence from said formations comprising, means for transforming a script formation into a plurality of series of electrical impulses, means for sequentially examining individual series of impulses to detect (1) amplitude extremals, (2) isolated representations of script formations, (3) indications of retrograde script formations and (4) indications of cusp and closure formations in said script, means for generating a separate binary signal for each one of said detected signal formations, means for storing said binary signals in an ordered sequence, means for grouping selected ones of said binary signals according to a pre-established program, means for registering a plurality of groups of binary signals, each group representing a different one of a selected plurality of alphabetic letters, means for comparing each selected group of binary signals with each one of said registered groups of binary signals, and means responsive to the highest correlation between said selected groups of signals and said registered groups of signals for producing electrical indications of the alphabetic letters represented by said registered groups.

8. Apparatus for identifying the individual letters in a script formation of connected cursive alphabetic letters comprising means for generating signals proportional to the coordinates of position of a writing instrument as an operator moves it over a writing area to form alphabetic letters within prescribed parallel guide lines, said guide lines being prescribed such that small letters such as $a$ and $e$ are relegated to the centermost area defined by said guide lines, letters with vertical extensions such as $l$ and $t$ are relegated to the upper two areas, and letters with lower extensions such as $g$ and $y$ are relegated to the lower two areas defined by said guide lines, means for detecting individual significant features of alphabetic letters in said signals, said feature detecting means including means for examining said signals to detect portions thereof representative of (1) alphabet letter portions that occupy at least one of said areas defined by said guide lines, (2) dot marks and cross marks that occupy the topmost area, (3) slash marks associated with said alphabetic letters that occupy the centermost area, (4) retrograde segments in said alphabetic letters, (5) cusps in said alphabetic letters, and (6) closures in said alphabetic letters, means for registering detected significant features, means for preregistering similar discrete features representative of the individual letters of a preselected alphabet, means for comparing said registered detected features with said preregistered alphabetic letter features, and means operably responsive to said comparing means for producing indicia representative of the alphabetic letters written on said writing area.

9. A method for identifying connected cursive symbols comprising the steps of translating said connected cursive symbols into two electrical signals representing components of said script in two coordinate directions, examining said signal representation for significant elements of written intelligence, said elements including (1) symbol extremals in a first coordinate direction, (2) isolated symbol segments, (3) symbol segments extending in a second coordinate direction, (4) sharp symbol peaks, and (5) symbol portions indicative of closures, registering said significant elements in pre-established groups corresponding to individual letters of a selected alphabet, preregistering groups of significant elements of cursive symbols representing the individual symbols of each one of a selected ensemble of symbols, individually comparing said registered groups of significant elements with each one of said groups of preregistered elements, and identifying said discrete element portions in accordance with said comparison.

10. Apparatus for automatically reading cursive script comprising means for generating signals proportional to the coordinates of position of a writing instrument as it is moved to produce written intelligence, means for registering significant features of written intelligence characterized by said signals, means for segmenting said registered features into discrete portions corresponding to individual alphabetic letters, means for preregistering discrete feature portions representing the individual letters of a preselected alphabet, means for comparing said discrete feature portions with said preregistered feature portions, and means operably responsive to said preregistered portions for identifying said discrete feature portions.

11. Apparatus for identifying alphabetic letters in formations of connected cursive script comprising means for generating a signal representation of an entire formation of connected cursive script, means for deriving a coded signal representation of each of a plurality of variations in said signal, means for arranging consecutive ones of said coded signals into discrete groups representing individual alphabetic letters, means for comparing each of said discrete groups with each one of a plurality of preregistered groups of coded signals representing respectively the individual letters of an alphabet, and means responsive to the magnitude of the differential produced by said comparator means for identifying that one of the alphabetic letters represented by said derived coded signal group.

12. Apparatus for automatically reading cursive script comprising means for generating real time signals proportional to the coordinates of position of a writing instrument as it is moved over a surface to produce written intelligence, means for quantizing said signals in two coordinate directions, means for normalizing said quantized signals to produce a regular time sequence of significantly differing signals, means for registering individual significant elements of written intelligence characterized by said sequence of quantized signals, means for segmenting said registered elements into discrete portions corresponding to individual alphabetic letters, means for preregistering discrete element portions representing the individual letters of a preselected alphabet, means for comparing said discrete quantized element portions with said preregistered element portions, and means operably responsive to said preregistered portions for identifying said discrete quantized element portions.

13. Apparatus for separating a formation of connected cursive script characters into individual alphabetic letters comprising means for generating a time sequence of signals characteristic of said formation, means for analyzing said sequence of signals to obtain a measure $nw$ of the formation width, means for estimating the number of letters $n$ in the span $nw$, means for subdividing said width measure into a plurality of $n$ equal segments $w$, the width of each of said segments $w$ representing the average width of an alphabetic letter of said formation of connected cursive script, means for analyzing said sequence of symbols to produce a signal characteristic of each one of a plurality of selected features of alphabetic letters, means for producing a sequence of marking pulses, means for gating a marking pulse to an output circuit, at intervals proportional to one-half of the width of said segments $w$, before and after selected ones of said signals characteristic of said alphabetic letter features, and means in said output circuit for utilizing said marking signals to separate said time sequence of signals into portions representative of individual alphabetic letters.

14. Apparatus for separating a formation of connected cursive script characters into individual alphabet letters comprising means for generating a time varying signal characteristic of a formation of connected script letters, means for counting the number of times the magnitude of said time varying signal representing the instantaneous height of said script characters is equal to the average magnitude of said signal, means for utilizing approximately one-third of said count as a measure of the number of individual letters in said formation, means for examining said time varying signal to detect selected signal relationships representative of vertical alphabetic letter extensions, retrograde portions of said script formation and disconnected portions of said script formations, means responsive to said selected signal relationships and to said measure of average letter width for generating a marking signal before and after each one of said selected signal relationships, said marking signals being displaced from said selected signal relationships by one-half of said average letter width measure, and means responsive to said marking signals for identifying that portion of said script formation between each pair of marking signals as one individual letter of said alphabet.

15. Apparatus for separating a formation of connected cursive script symbols into discrete alphabetic letters comprising means for generating signals proportional to the coordinates of position of a writing instrument as it is moved by an operator to produce a sequence of connected cursive alphabet letters, means for extracting individual significant features of alphabetic letters from said signals, said means for extracting significant features including means for examining said signals to detect signal portions representing (1) vertical extensions in successive portions of said script formation, (2) the presence of dot marks, cross marks, and slash marks in said formation, and (3) the presence of retrograde segments in said formation, means for analyzing said signals to obtain a measure $nw$ of the formation width, means for estimating the number of letters $n$ in the span $nw$, means for subdividing said width measure into a plurality of $n$ equal segments $w$, whereby the width of each of said segments $w$ represents the average width of a typical alphabetic letter in said formation, means for producing a sequence of marking pulses, means for gating one of said marking pulses to an output circuit at intervals before and after selected ones of said significant features, said intervals being selected to be proportional to one-half of the width $w$ of said segments, and means in said output circuit for utilizing said marking signals to separate said signals into portions representative of individual alphabetic letters.

16. The method of separating a formation of connected cursive script letters into individual alphabetic letters comprising the steps of: generating a time varying signal characteristic of a formation of connected cursive script letters; analyzing the time varying signal to obtain a measure of the width of said formation, counting the number of times that the line which comprises said cursive script formation crosses an axis drawn in the direction of writing through said formation at the approximate center thereof, dividing said count by a preselected small integer to obtain an approximate measure of the number of letters in said formation, examining said time varying signal for significant elements of alphabetic letters, said elements including, amplitude extremals, isolated representations of script portions, and indications of retrograde script portions, and assigning the portions of said formations of script letters encompassed by a spacing equal to an average letter width centered about each one of said significant elements, to one discrete alphabetic letter only.

References Cited in the file of this patent
UNITED STATES PATENTS

| | | |
|---|---|---|
| 2,889,535 | Rochester et al. | June 2, 1959 |
| 2,907,824 | Peek | Oct. 6, 1959 |
| 2,928,074 | Sutter | Mar. 8, 1960 |
| 2,932,006 | Glauberman | Apr. 5, 1960 |
| 3,016,421 | Harmon | Jan. 9, 1962 |
| 3,050,711 | Harmon | Aug. 21, 1962 |

FOREIGN PATENTS

| | | |
|---|---|---|
| 229,622 | Australia | Oct. 23, 1958 |
| 846,722 | Great Britain | Aug. 31, 1960 |
| 233,210 | Australia | Apr. 5, 1961 |

OTHER REFERENCES

Young, D. A.: Automatic Character Recognition, Electronic Engineering, January 1960, pp. 2–10.